(12) United States Patent
Wang et al.

(10) Patent No.: US 10,171,142 B2
(45) Date of Patent: Jan. 1, 2019

(54) DATA TRANSMISSION METHOD, APPARATUS, AND DEVICE

(71) Applicant: Huawei Technologies Co., Ltd., Shenzhen (CN)

(72) Inventors: Lei Wang, Shanghai (CN); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/694,582

(22) Filed: Sep. 1, 2017

(65) Prior Publication Data

US 2018/0013472 A1 Jan. 11, 2018

Related U.S. Application Data

(63) Continuation of application No. PCT/CN2015/073543, filed on Mar. 3, 2015.

(51) Int. Cl.
*H04B 7/0456* (2017.01)
*H04B 7/06* (2006.01)

(52) U.S. Cl.
CPC .......... *H04B 7/0456* (2013.01); *H04B 7/06* (2013.01)

(58) Field of Classification Search
CPC ................ H04B 7/0456; H04B 7/06
See application file for complete search history.

(56) References Cited

U.S. PATENT DOCUMENTS

| 2013/0044800 A1 | 2/2013 | Ogawa et al. |
| 2014/0019408 A1 | 1/2014 | Ryu et al. |
| 2014/0019409 A1 | 1/2014 | Tseng et al. |

FOREIGN PATENT DOCUMENTS

| CN | 101291192 A | 10/2008 |
| CN | 101582752 A | 11/2009 |
| CN | 102594519 A | 7/2012 |
| EP | 2503706 A2 | 9/2012 |

*Primary Examiner* — Vineeta S Panwalkar
(74) *Attorney, Agent, or Firm* — Leydig, Voit & Mayer, Ltd.

(57) ABSTRACT

Embodiments of the present invention provide a data transmission method, apparatus, and device, so as to improve efficiency in utilizing a time-frequency resource. The method includes: determining, by a transmit end device, a signature matrix S according to a quantity L of layers of a data stream and a quantity R of receive antennas used by a receive end device; determining, by the transmit end device, a precoding matrix P according to a channel matrix H and the signature matrix S, and performing precoding processing on the L-layer data stream according to the precoding matrix P; and sending, by the transmit end device to the receive end device, the L-layer data stream on which the precoding processing has been performed and information used to indicate the signature matrix S.

20 Claims, 7 Drawing Sheets

200

A transmit end device performs bit mapping processing on L-layer bit information according to a preset constellation point set, to generate an L-layer data stream, where L layers of the data stream correspond to a same time-frequency resource, and L≥2 — S210

The transmit end device determines a signature matrix S according to the quantity L of layers of the data stream and a quantity R of first spatial domain resources used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R first spatial domain resources, the R first elements include at least one zero element and at least one non-zero element, R≥2, and the L first element sequences are different from each other — S220

The transmit end device determines a precoding matrix P according to a channel matrix H and the signature matrix S, and performs precoding processing on the L-layer data stream according to the precoding matrix P, where the channel matrix H corresponds to channels between the transmit end device and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream — S230

The transmit end device sends, to the receive end device, the L-layer data stream on which the precoding processing has been performed and information used to indicate the signature matrix S, so that the transmit end device performs, according to the signature matrix S and the constellation point set, demodulation processing on the L-layer data stream on which the precoding processing has been performed, to obtain the L-layer bit information — S240

A receive end device receives data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the receive end device, and the precoding matrix P includes L second element sequences arranged in the first dimensional direction ⎯ S310

The receive end device performs, according to the signature matrix S and the constellation point set, demodulation processing on the L-layer data stream on which the precoding processing has been performed, to obtain the L-layer bit information ⎯ S320

FIG. 4

DATA TRANSMISSION METHOD, APPARATUS, AND DEVICE

CROSS-REFERENCE TO RELATED APPLICATIONS

This application is a continuation of International Application No. PCT/CN2015/073543, filed on Mar. 3, 2015, the disclosure of which is hereby incorporated by reference in its entirety.

TECHNICAL FIELD

Embodiments of the present invention relate to the communications field, and more specifically, to a data processing method, apparatus, and device.

BACKGROUND

A multiple-input multiple-output ("MIMO" for short) technology means that multiple transmit antennas are used at a transmit end device and multiple receive antennas are used at a receive end device, so that signals are transmitted by using the multiple antennas of the transmit end device and received by using the multiple antennas of the receive end device, thereby improving communication quality. By means of the MIMO technology, full use of spatial resources can be made, multiple output and multiple input are implemented by using multiple antennas, and a system channel capacity can be exponentially increased without increasing spectrum resources and transmit power of an antenna. With such obvious advantages, the MIMO technology is considered as a core technology of next-generation mobile communications.

Specifically, the transmit end device maps, onto the multiple antennas by means of space-time mapping, a data signal to be sent, to send the data signal. The receive end device performs space time decoding on signals received by using the antennas, so as to recover the data signal sent by the transmit end device.

With development and popularization of wireless communications technologies, service traffic of wireless communications sharply increases. How to improve efficiency in utilizing a limited quantity of receive antennas becomes an urgent problem to be resolved at present.

SUMMARY

Embodiments of the present invention provide a data transmission method, apparatus, and device, so as to improve efficiency in utilizing a time-frequency resource.

According to a first aspect, a data transmission method is provided. The method includes: determining, by a transmit end device, a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, R≥2, the L first element sequences are different from each other, the L layers of the data stream correspond to a same time-frequency resource, and L≥2; determining, by the transmit end device, a precoding matrix P according to a channel matrix H and the signature matrix S, and performing precoding processing on the L-layer data stream according to the precoding matrix P, where the channel matrix H corresponds to channels between the transmit end device and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream; and sending, by the transmit end device to the receive end device, the L-layer data stream on which the precoding processing has been performed and information used to indicate the signature matrix S.

With reference to the first aspect, in a first implementation of the first aspect, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the transmit end device; and the determining, by the transmit end device, a precoding matrix P according to a channel matrix H and the signature matrix S includes: generating a first intermediate matrix according to a quantity K of non-zero elements and locations of the non-zero elements in an $i^{th}$ first element sequence included in the signature matrix S, where the first intermediate matrix includes K second element sequences of the R second element sequences; generating a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and i belongs to [1, L]; performing singular value decomposition processing on the second intermediate matrix, to determine a null subspace of the second intermediate matrix; determining a third intermediate matrix according to the null subspace of the second intermediate matrix and the first intermediate matrix; performing singular value decomposition processing on the third intermediate matrix, to determine an orthogonal subspace of the third intermediate matrix; and determining an $i^{th}$ second element sequence of the precoding matrix P according to the orthogonal subspace of the third intermediate matrix and the null subspace of the second intermediate matrix.

With reference to the first aspect and the foregoing implementation, in a second implementation of the first aspect, the determining an $i^{th}$ second element sequence of the precoding matrix P according to the orthogonal subspace of the third intermediate matrix and the null subspace of the second intermediate matrix includes: determining a target sequence from the orthogonal subspace of the third intermediate matrix according to a maximum value of multiple singular values that are obtained by performing the singular value decomposition processing on the third intermediate matrix; and determining the $i^{th}$ second element sequence of the precoding matrix P according to the target sequence and the null subspace of the second intermediate matrix.

With reference to the first aspect and the foregoing implementations, in a third implementation of the first aspect, the determining, by the transmit end device, a precoding matrix P according to a channel matrix H and the signature matrix S includes: determining, by the transmit end device, the precoding matrix P according to the channel matrix H, the signature matrix S, and a power allocation matrix D, where the power allocation matrix D is used for power allocation among the L layers of the data stream.

With reference to the first aspect and the foregoing implementations, in a fourth implementation of the first aspect, the generating a first intermediate matrix according to a quantity K of non-zero elements and locations of the non-zero elements in an $i^{th}$ first element sequence included in the signature matrix S includes: generating the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and the generating a second intermediate matrix according to a quantity M of zero elements and locations of the zero elements in the $i^{th}$ first element sequence included in the signature matrix S includes: generating the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

With reference to the first aspect and the foregoing implementations, in a fifth implementation of the first aspect, the determining, by a transmit end device, a signature matrix S according to a quantity L of layers of the data stream and a quantity R of receive antennas used by a receive end device includes: determining, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

With reference to the first aspect and the foregoing implementations, in a sixth implementation of the first aspect, the quantity L of layers of the data stream is greater than the quantity R of the receive antennas.

With reference to the first aspect and the foregoing implementations, in a seventh implementation of the first aspect, a value of the non-zero element is 1.

With reference to the first aspect and the foregoing implementations, in an eighth implementation of the first aspect, the transmit end device is a network device, and the receive end device is a terminal device; or the transmit end device is a terminal device, and the receive end device is a network device.

According to a second aspect, a data transmission method is provided. The method includes: receiving, by a receive end device, data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the receive end device, and the precoding matrix P includes L second element sequences arranged in the first dimensional direction; and performing, by the receive end device according to the signature matrix S and the constellation point set, demodulation processing on the L-layer data stream on which the precoding processing has been performed, to obtain the L-layer bit information.

With reference to the second aspect, in a first implementation of the second aspect, the performing, by the receive end device according to the signature matrix S and the constellation point set, demodulation processing on the L-layer data stream on which the precoding processing has been performed includes: performing, by the receive end device, channel estimation to determine data to be demodulated that is based on the L-layer data stream on which the precoding processing has been performed; determining, by the receive end device, a codebook according to the signature matrix S and the constellation point set; and performing, by the receive end device according to the codebook, message passing algorithm MPA iterative processing on the data to be demodulated.

With reference to the second aspect or the foregoing implementation, in a second implementation of the second aspect, the transmit end device is a network device, and the receive end device is a terminal device; or the transmit end device is a terminal device, and the receive end device is a network device.

According to a third aspect, a data transmission apparatus is provided. The apparatus includes: a determining unit, configured to: determine a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, R≥2, the L first element sequences are different from each other, the L layers of the data stream correspond to a same time-frequency resource, and L≥2; and determine a precoding matrix P according to a channel matrix H and the signature matrix S; a processing unit, configured to perform precoding processing on the L-layer data stream according to the precoding matrix P, where the channel matrix H corresponds to channels between the apparatus and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream; and a sending unit, configured to send, to the receive end device, the L-layer data stream on which the precoding processing has been performed and information to indicate the signature matrix S.

With reference to the third aspect, in a first implementation of the third aspect, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the apparatus; and the determining unit is specifically configured to: generate a first intermediate matrix according to a quantity K of non-zero elements and locations of the non-zero elements in an $i^{th}$ first element sequence included in the signature matrix S, where the first intermediate matrix includes K second element sequences of the R second element sequences; generate a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and i belongs to [1, L]; perform singular value decomposition processing on the second intermediate matrix, to determine a null subspace of the second intermediate matrix; determine a third intermediate matrix according to the null subspace of the second intermediate matrix and the first intermediate matrix; perform singular value decomposition processing on the third intermediate matrix, to determine an orthogonal subspace of the third intermediate matrix; and determine an $i^{th}$ second element sequence of the precoding matrix P according to the orthogonal subspace of the third intermediate matrix and the null subspace of the second intermediate matrix.

With reference to the third aspect and the foregoing implementation, in a second implementation of the third aspect, the determining unit is specifically configured to: determine a target sequence from the orthogonal subspace of the third intermediate matrix according to a maximum value of multiple singular values that are obtained by performing the singular value decomposition processing on the third intermediate matrix; and determine the $i^{th}$ second element sequence of the precoding matrix P according to the target sequence and the null subspace of the second intermediate matrix.

With reference to the third aspect and the foregoing implementations, in a third implementation of the third aspect, the determining unit is specifically configured to determine the precoding matrix P according to the channel matrix H, the signature matrix S, and a power allocation matrix D, where the power allocation matrix D is used for power allocation among the L layers of the data stream.

With reference to the third aspect and the foregoing implementations, in a fourth implementation of the third aspect, the determining unit is specifically configured to: generate the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and generate the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

With reference to the third aspect and the foregoing implementations, in a fifth implementation of the third aspect, the determining unit is specifically configured to determine, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

With reference to the third aspect and the foregoing implementations, in a sixth implementation of the third aspect, the quantity L of layers of the data stream is greater than the quantity R of the receive antennas.

With reference to the third aspect and the foregoing implementations, in a seventh implementation of the third aspect, a value of the non-zero element is 1.

With reference to the third aspect and the foregoing implementations, in an eighth implementation of the third aspect, the apparatus is a network device, and the receive end device is a terminal device; or the apparatus is a terminal device, and the receive end device is a network device.

According to a fourth aspect, a data transmission apparatus is provided. The apparatus includes: a receiving unit, configured to receive data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the apparatus, and the precoding matrix P includes L second element sequences arranged in the first dimensional direction; and a processing unit, configured to perform, according to the signature matrix S and the constellation point set, demodulation processing on the L-layer data stream on which the precoding processing has been performed, to obtain the L-layer bit information.

With reference to the fourth aspect, in a first implementation of the fourth aspect, the processing unit is specifically configured to: perform channel estimation to determine data to be demodulated that is based on the L-layer data stream on which the precoding processing has been performed;

determine a codebook according to the signature matrix S and the constellation point set; and perform, according to the codebook, message passing algorithm MPA iterative processing on the data to be demodulated.

With reference to the fourth aspect or the foregoing implementation, in a second implementation of the fourth aspect, the transmit end device is a network device, and the apparatus is a terminal device; or the transmit end device is a terminal device, and the apparatus is a network device.

According to a fifth aspect, a data transmission device is provided. The device includes: a bus; a processor connected to the bus; a memory connected to the bus; and a transmitter connected to the bus, where the processor calls, by using the bus, a program stored in the memory, so as to: determine a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, R≥2, the L first element sequences are different from each other, the L layers of the data stream correspond to a same time-frequency resource, and L≥2; determine a precoding matrix P according to a channel matrix H and the signature matrix S, and perform precoding processing on the L-layer data stream according to the precoding matrix P, where the channel matrix H corresponds to channels between the device and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream; and control the transmitter to send, to the receive end device, the L-layer data stream on which the precoding processing has been performed and information used to indicate the signature matrix S.

With reference to the fifth aspect, in a first implementation of the fifth aspect, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the device; and the processor is specifically configured to: generate a first intermediate matrix according to a quantity K of non-zero elements and locations of the non-zero elements in an $i^{th}$ first element sequence included in the signature matrix S, where the first intermediate matrix includes K second element sequences of the R second element sequences; generate a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and i belongs to [1, L]; perform singular value decomposition processing on the second intermediate matrix, to determine a null subspace of the second intermediate matrix; determine a third intermediate matrix according to the null subspace of the second intermediate matrix and the first intermediate matrix; perform singular value decomposition processing on the third intermediate matrix, to determine an orthogonal subspace of the third intermediate matrix; and determine an $i^{th}$ second element sequence of the precoding matrix P according to the orthogonal subspace of the third intermediate matrix and the null subspace of the second intermediate matrix.

With reference to the fifth aspect and the foregoing implementation, in a second implementation of the fifth aspect, the processor is specifically configured to: determine a target sequence from the orthogonal subspace of the third intermediate matrix according to a maximum value of multiple singular values that are obtained by performing the singular value decomposition processing on the third intermediate matrix; and determine the $i^{th}$ second element sequence of the precoding matrix P according to the target sequence and the null subspace of the second intermediate matrix.

With reference to the fifth aspect and the foregoing implementations, in a third implementation of the fifth aspect, the processor is specifically configured to determine the precoding matrix P according to the channel matrix H, the signature matrix S, and a power allocation matrix D, where the power allocation matrix D is used for power allocation among the L layers of the data stream.

With reference to the fifth aspect and the foregoing implementations, in a fourth implementation of the fifth aspect, the processor is specifically configured to: generate the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and generate the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

With reference to the fifth aspect and the foregoing implementations, in a fifth implementation of the fifth aspect, the processor is specifically configured to determine, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

With reference to the fifth aspect and the foregoing implementations, in a sixth implementation of the fifth aspect, the quantity L of layers of the data stream is greater than the quantity R of the receive antennas.

With reference to the fifth aspect and the foregoing implementations, in a seventh implementation of the fifth aspect, a value of the non-zero element is 1.

With reference to the fifth aspect and the foregoing implementations, in an eighth implementation of the fifth aspect, the device is a network device, and the receive end device is a terminal device; or the device is a terminal device, and the receive end device is a network device.

According to a sixth aspect, a data transmission device is provided. The device includes: a bus; a processor connected to the bus; a memory connected to the bus; and a receiver connected to the bus, where the processor calls, by using the bus, a program stored in the memory, so as to: control the receiver to receive data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the device, and the precoding matrix P includes L second element sequences arranged in the first dimensional direction; and perform, according to the signature matrix S and the constellation point set, demodulation processing on the L-layer data stream on which the precoding processing has been performed, to obtain the L-layer bit information.

With reference to the sixth aspect, in a first implementation of the sixth aspect, the processor is specifically configured to: perform channel estimation to determine data to be demodulated that is based on the L-layer data stream on which the precoding processing has been performed; determine a codebook according to the signature matrix S and the constellation point set; and perform, according to the codebook, message passing algorithm MPA iterative processing on the data to be demodulated.

With reference to the sixth aspect or the foregoing implementation, in a second implementation of the sixth aspect, the transmit end device is a network device, and the device is a terminal device; or the transmit end device is a terminal device, and the device is a network device.

According to the data transmission method, apparatus, and device in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2 is a schematic flowchart of a data transmission method according to an embodiment of the present invention;

FIG. 4 is a schematic flowchart of a data transmission method according to another embodiment of the present invention;

DESCRIPTION OF EMBODIMENTS

Figure 1:
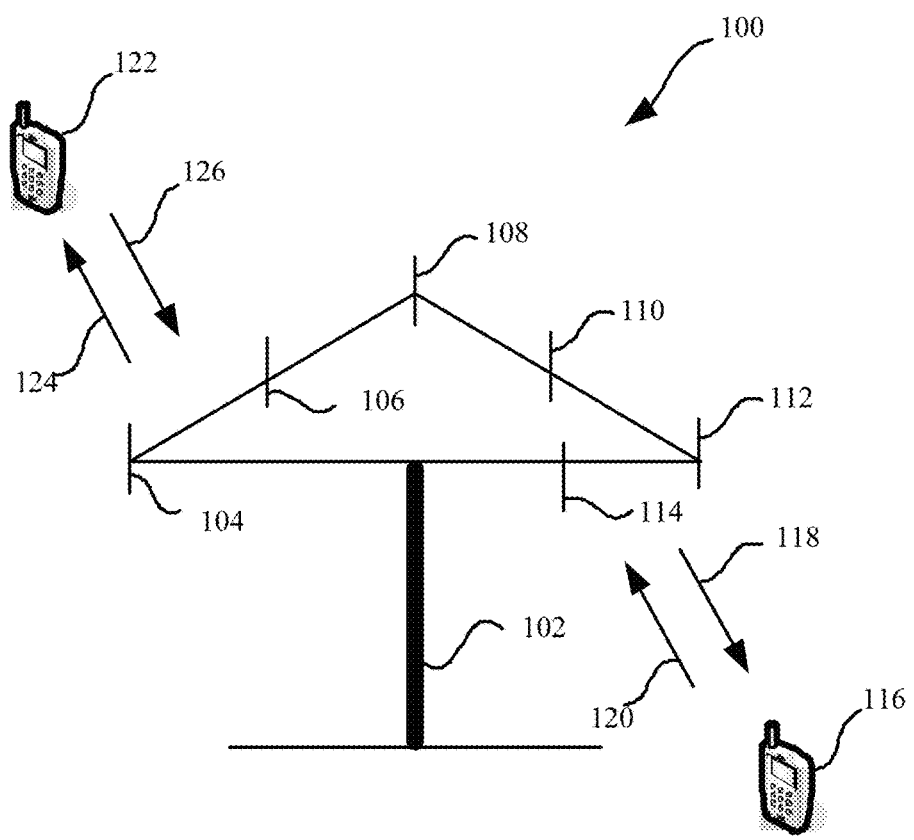
FIG. 1 is a schematic diagram of a communications system to which a data transmission method of the present invention applies.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

The embodiments are described with reference to a terminal device in the present invention. A terminal device may also be referred to as user equipment (UE, User Equipment), an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communications function, a computing device, another processing device connected to a wireless modem, an in-vehicle device, a wearable device, or a terminal device in a future 5G network.

In addition, the embodiments are described with reference to a network device in the present invention. The network device may be a device such as a network side device used for communicating with a mobile device. The network side device may be a BTS (Base Transceiver Station, base transceiver station) in GSM (Global System for Mobile communications, Global System for Mobile Communications) or CDMA (Code Division Multiple Access, Code Division Multiple Access); or may be an NB (NodeB, NodeB) in WCDMA (Wideband Code Division Multiple Access, Wideband Code Division Multiple Access); or may be an eNB or eNodeB (Evolved Node B, evolved NodeB) in LTE (Long Term Evolution, Long Term Evolution), a relay station or an access point, a vehicle-mounted device, a wearable device, or a network side device in a future 5G network, or the like.

In addition, aspects or features of the present invention may be implemented as a method, an apparatus, or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk)), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system using a data transmission method of the present invention. As shown in FIG. 1, the communications system 100 includes a network side device 102, and the network side device 102 may include multiple antenna groups. Each antenna group may include multiple antennas. For example, an antenna group may include an antenna 104 and an antenna 106. Another antenna group may include an antenna 108 and an antenna 110. An additional group may include an antenna 112 and an antenna 114. FIG. 1 shows two antennas for each antenna group, but more or fewer antennas may be used for each group. The network side device 102 may additionally include a transmitter chain and a receiver chain. A person of ordinary skill in the art may understand that both the transmitter chain and the receiver chain may include multiple components (for example, a processor, a modulator, a multiplexer, a demodulator, a demultiplexer, and an antenna) related to signal sending and receiving.

The network side device 102 may communicate with multiple terminal devices (for example, a terminal device 116 and a terminal device 122). However, it may be understood that, the network side device 102 may communicate with any quantity of terminal devices similar to the terminal device 116 or the terminal device 122. The terminal device 116 and the terminal device 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antenna 112 and the antenna 114. The antenna 112 and the antenna 114 send information to the terminal device 116 by using a forward link 118, and receive information from the terminal device 116 by using a reverse link 120. In addition, the terminal device 122 communicates with the antenna 104 and the antenna 106. The antenna 104 and the antenna 106 send information to the terminal device 122 by using a forward link 124, and receive information from the terminal device 122 by using a reverse link 126.

For example, in a frequency division duplex (FDD, Frequency Division Duplex) system, for example, the forward link 118 may use a frequency band different from a frequency band used by the reverse link 120. The forward link 124 may use a frequency band different from a frequency band used by the reverse link 126.

For another example, in a time division duplex (TDD, Time Division Duplex) system and a full duplex (Full Duplex) system, the forward link 118 and the reverse link 120 may use a common frequency band, and the forward link 124 and the reverse link 126 may use a common frequency band.

Each group of antennas and/or areas designed for communications is referred to as a sector of the network side device 102. For example, an antenna group may be designed to communicate with a terminal device in a sector of a coverage area of the network side device 102. When the network side device 102 communicates with the terminal device 116 and the terminal device 122 by respectively using the forward link 118 and the forward link 124, transmit antennas of the network side device 102 may improve signal-to-noise ratios of the forward link 118 and the forward link 124 by means of beamforming. In addition, compared with a manner in which a network side device sends signals to all terminal devices of the network side device by using one single antenna, when the network side device 102 sends, by means of beamforming, signals to the terminal device 116 and the terminal device 122 that are randomly dispersed in a related coverage area, a mobile device in a neighboring cell suffers less interference.

In a given time, the network side device 102, the terminal device 116, or the terminal device 122 may be a wireless communications sending apparatus and/or a wireless communications receiving apparatus. During data transmission, the wireless communications sending apparatus may encode data for transmission. Specifically, the wireless communications sending apparatus may obtain (for example, generate, receive from another communications apparatus, or save in a memory) a particular quantity of data bits that need to be sent to the wireless communications receiving apparatus by using a channel. The data bits may be included in a transport block (or multiple transport blocks) of data, and the transport block may be segmented to generate multiple code blocks.

FIG. 2 shows a schematic flowchart of a data transmission method 200 from the perspective of a transmit end device according to an embodiment of the present invention. As shown in FIG. 2, the method 200 includes the following steps.

S210: A transmit end device determines a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, R≥2, the L first element sequences are different from each other, the L layers of the data stream correspond to a same time-frequency resource, and L≥2.

S220: The transmit end device determines a precoding matrix P according to a channel matrix H and the signature matrix S, and performs precoding processing on the L-layer data stream according to the precoding matrix P, where the channel matrix H corresponds to channels between the transmit end device and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream.

S230: The transmit end device sends, to the receive end device, the L-layer data stream on which the precoding processing has been performed and information used to indicate the signature matrix S.

Optionally, the transmit end device is a network device, and the receive end device is a terminal device.

Alternatively, the transmit end device is a terminal device, and the receive end device is a network device.

In this embodiment of the present invention, the transmit end device may be a network device (for example, a network side device such as a base station), and the receive end device may be a terminal device (for example, user equipment), that is, the method 200 may be applied to downlink transmission.

Alternatively, the transmit end device may be a terminal device (for example, user equipment), and the receive end device may be a network device (for example, a network side device such as a base station), that is, the method 200 may be applied to uplink transmission.

For ease of understanding and description, the following describes in detail a procedure of the method 200 by using a network device as a transmit end device (that is, an execution body of the data processing method 200 of this embodiment of the present invention).

Specifically, the network device may perform, according to a preset constellation point set, bit mapping processing (which may also be referred to as modulation processing) on a multi-layer information bit that needs to be sent to the terminal device, to generate the L-layer data stream (that is, L modulation symbol sequences). It needs to be noted that in the communications system 100 using the data transmission method 200 of this embodiment of the present invention, the network device may multiplex a same time-frequency resource to perform data transmission with the terminal device, that is, the L layers of the data stream correspond to a same time-frequency resource.

For the same time-frequency resource, for example, in a manner of dividing a time-frequency resource using a resource element (RE, Resource Element) as a unit, the time-frequency resource may be a time-frequency resource block (which may also be referred to as a time-frequency resource group) that includes one or more REs. In addition, locations of the one or more REs in a time domain are the same (that is, the one or more REs correspond to a same symbol), and locations of the one or more REs on a frequency domain are the same (that is, the one or more REs correspond to a same carrier).

In addition, a method for and a process of performing, based on the constellation point set, bit mapping processing may be the same as a method and a process in the prior art (for example, modulation processing in an LTE system). To avoid repetition, detailed description is omitted herein.

Subsequently, the network device may determine the quantity R of the receive antennas (or spatial domain resources) used by the terminal device to receive the L-layer data.

The quantity of the receive antennas may be understood as a quantity of antenna ports used when the terminal device receives the L-layer data, or may be understood as a quantity of antennas used when the terminal device receives the L-layer data, or may be understood as another physical meaning related to the spatial domain resource. The understanding is applicable to all the embodiments of the present invention, and details are not described below. Understanding of a quantity of transmit antennas may be similar to that of the quantity of the receive antennas.

Similarly, in this embodiment of the present invention, the quantity of the transmit antennas (or spatial domain resources) used by the network device to send the L-layer data is denoted as T.

The quantity of the transmit antennas may be understood as a quantity of antenna ports used when the network device sends the L-layer data, or may be understood as a quantity of antennas used when the network device sends the L-layer data.

In addition, in this embodiment of the present invention, the terminal device may send, to the network device in advance (for example, during access), information indicating the quantity R of the receive antennas. Alternatively, the quantity R of the receive antennas may be pre-stored as user information in a storage network element in a system. Therefore, the network device may obtain the information indicating the quantity R of the receive antennas when obtaining the user information from the storage network element.

It should be noted that in this embodiment of the present invention, the receive antennas may be all or some antennas that can be used by the terminal device. The transmit antennas may be all or some antennas that can be used by the network device. This is not particularly limited in the present invention.

Subsequently, the network device may determine the signature matrix according to the quantity L of layers of the data stream and the quantity R of the receive antennas.

In this embodiment of the present invention, dimensions of a matrix include a row and a column, that is, the first dimensional direction may be a row direction of the matrix, and the second dimensional direction may be a column direction of the matrix. Alternatively, the first dimensional direction may be a column direction of the matrix, and the second dimensional direction may be a row direction of the matrix. This is not particularly limited in the present invention. For ease of understanding and description, unless particularly specified, an example in which a row direction is used as the first dimensional direction is used for description below.

That is, in this embodiment of the present invention, a size of the signature matrix S may be R×L, that is, the signature matrix S may include R row element sequences or L column element sequences (that is, the first element sequences). Elements in each column element sequence have sparsity, that is, each column element sequence (including R elements) has at least one zero element and at least one non-zero element.

In addition, in this embodiment of the present invention, the L first element sequences are different from each other. Specifically, distribution locations of zero elements and non-zero elements in the L first element sequences are different from each other.

By way of example but not limitation, in this embodiment of the present invention, a value of the non-zero element may be set to 1.

In addition, in this embodiment of the present invention, quantities of non-zero elements in the columns of the signature matrix S may be the same or may be different. This is not particularly limited in the present invention.

For example, when R=4 (that is, the quantity of the antennas used by the terminal device is 4), and L=6 (that is, a quantity of the generated modulation symbol sequences is 6), the signature matrix S may be represented as:

$$S = \begin{pmatrix} 1 & 0 & 0 & 1 & 0 & 1 \\ 1 & 1 & 0 & 0 & 1 & 0 \\ 0 & 1 & 1 & 1 & 0 & 0 \\ 0 & 0 & 1 & 0 & 1 & 1 \end{pmatrix}$$

Alternatively, when R=4 (that is, the quantity of the antennas used by the terminal device is 4), and L=6 (that is, a quantity of the generated modulation symbol sequences is 6), the signature matrix S may be represented as:

$$S = \begin{pmatrix} 1 & 0 & 0 & 1 & 0 & 1 \\ 1 & 1 & 0 & 0 & 1 & 0 \\ 1 & 1 & 1 & 1 & 0 & 0 \\ 0 & 0 & 1 & 0 & 1 & 1 \end{pmatrix}$$

Alternatively, when R=8 (that is, the quantity of the antennas used by the terminal device is 8), and L=12 (that is, a quantity of the generated modulation symbol sequences is 12), the signature matrix S may be represented as:

$$S = \begin{pmatrix} 1 & 0 & 0 & 0 & 1 & 0 & 0 & 0 & 1 & 0 & 0 & 0 \\ 0 & 0 & 1 & 0 & 0 & 0 & 1 & 0 & 0 & 1 & 0 & 0 \\ 1 & 0 & 0 & 0 & 0 & 0 & 1 & 0 & 0 & 0 & 1 & 0 \\ 0 & 0 & 1 & 0 & 1 & 0 & 0 & 0 & 0 & 0 & 0 & 1 \\ 0 & 1 & 0 & 0 & 0 & 0 & 0 & 0 & 1 & 0 & 0 & 0 \\ 0 & 0 & 0 & 1 & 0 & 0 & 0 & 1 & 0 & 1 & 0 & 0 \\ 0 & 1 & 0 & 0 & 0 & 0 & 0 & 1 & 0 & 0 & 1 & 0 \\ 0 & 0 & 0 & 1 & 0 & 1 & 0 & 0 & 0 & 0 & 0 & 1 \end{pmatrix}$$

It should be understood that the above listed specific values of the signature matrix S are merely an example for description, and the present invention is not limited thereto, provided that it can be ensured that each column of the signature matrix S includes at least one non-zero element and at least one zero element, and distribution locations of zero elements and non-zero elements of elements in columns of the signature matrix S are different from each other.

In addition, in this embodiment of the present invention, the L first element sequences are in one-to-one correspondence with the L layers of the data stream. Subsequently, a one-to-one correspondence between the L first element sequences and the L layers of the data stream is described in detail with reference to the precoding processing on the L-layer data stream.

Optionally, the determining, by a transmit end device, a signature matrix S according to a quantity L of layers of the data stream and a quantity R of receive antennas used by a receive end device includes:

determining, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

Specifically, in this embodiment of the present invention, a quantity of layers of a data stream and a quantity of spatial domain resources may be used as indexes. Multiple signature matrices are pre-stored in the network device. A parameter set including a value of a quantity of layers and a value of a quantity of spatial domain resources may correspond to one or more signature matrices. Therefore, the network device may find the signature matrix S according to specific values of L and R that are determined above.

Subsequently, the network device determines the channel matrix H corresponding to the channels. The channels between the network device and the terminal device may be represented as a channel set formed by T spatial domain resources used by the network device and R spatial domain resources used by the terminal device, that is, the channel matrix H may be represented as:

$$H = \begin{pmatrix} h_{11} & L & h_{1t} & L & h_{1T} \\ M & O & M & N & M \\ h_{r1} & L & h_{rt} & L & h_{rT} \\ M & N & M & O & M \\ h_{R1} & L & h_{Rt} & L & h_{RT} \end{pmatrix}$$

r∈(1,R), t∈(1,T), and $h_{rt}$ indicates a value that is determined according to the channel estimation and that is of a gain of a channel formed by an $r^{th}$ antenna (that is, an example of the receive antenna) of the terminal device and a $t^{th}$ antenna (that is, an example of the transmit antenna) of the network device.

It should be noted that a method for determining the channel matrix H by the network device may be similar to a method in the prior art. For example, the network device may determine the channel matrix H according to a feedback of the terminal device. Alternatively, the network device may determine the channel matrix H based on a channel detection technology. This is not particularly limited in the present invention.

Subsequently, the network device may determine the precoding matrix P according to the channel matrix H determined above and the signature matrix S.

In this embodiment of the present invention, the signature matrix S and the precoding matrix P both have L elements, for example, have L columns, in the first dimensional direction. In addition, the columns of the signature matrix S and the columns of the precoding matrix P have a correspondence. For example, in the signature matrix S and the precoding matrix P, columns having a same sequence number correspond to each other. For example, an $i^{th}$ column of the signature matrix S corresponds to an $i^{th}$ column of the precoding matrix P, where i∈[1, L].

Therefore, in this embodiment of the present invention, the columns of the precoding matrix P may be determined according to the columns of the signature matrix S, and further the precoding matrix P is determined.

Optionally, the determining, by the transmit end device, a precoding matrix P according to a channel matrix H and the signature matrix S includes:

determining, by the transmit end device, the precoding matrix P according to the channel matrix H and the signature matrix S, so that energy, of an $i^{th}$ layer of the data stream on which the precoding processing has been performed, on a spatial domain resource corresponding to a zero element in an $i^{th}$ first element sequence corresponding to the $i^{th}$ layer of the data stream is zero or approximates to zero, where I belongs to [1, L].

Specifically, in this embodiment of the present invention, the L columns of the precoding matrix P are in one-to-one correspondence with the L layers of the data stream. In addition, each column of the precoding matrix P is separately used to perform precoding processing on a corresponding layer of the data stream. In addition, as described above, the L columns of the precoding matrix P correspond to the L columns of the signature matrix S, and each column of the signature matrix S includes R elements (that is, the first elements) in one-to-one correspondence with the R receive antennas used by the terminal device. Therefore, each column of the precoding matrix P generated based on the signature matrix S corresponds to the receive antennas. In addition, each column of the signature matrix S has sparsity (that is, has at least one zero element and at least one non-zero element). Therefore, after the precoding processing is performed on the $i^{th}$ layer of the data by using the $i^{th}$ column of the precoding matrix P generated based on the signature matrix S, energy distribution of the $i^{th}$ layer of the data on the R receive antennas has sparsity. Therefore, by means of the sparsity, the network device can enable the energy, of the $i^{th}$ layer of the data stream on which the precoding processing has been performed, on the spatial domain resource corresponding to the zero element in the $i^{th}$ first element sequence corresponding to the $i^{th}$ layer of the data stream to be zero or approximate to zero. In this way, the terminal device can obtain, by means of demodulation, the L-layer bit information corresponding to the L-layer data stream by using an iterative algorithm such as a message passing algorithm and according to the sparsity (subsequently, the process is described in detail).

It should be understood that the above listed solution that can enable the energy, of the $i^{th}$ layer of the data stream on which the precoding processing has been performed, on the spatial domain resource corresponding to the zero element in the $i^{th}$ first element sequence corresponding to the $i^{th}$ layer of the data stream to be zero or approximate to zero is used as an example for description. The present invention is not limited thereto. For example, based on the sparsity of each column of the signature matrix S, the energy, of the $i^{th}$ layer of the data stream on which the precoding processing has been performed, on the spatial domain resource corresponding to the zero element in the $i^{th}$ first element sequence may be enabled to be a value that does not affect another layer of the data carried on the spatial domain resource. Alternatively, the energy, of the $i^{th}$ layer of the data stream on which the precoding processing has been performed, on the spatial domain resource corresponding to the zero element in the $i^{th}$ first element sequence may be enabled to be a value by which the terminal device can recognize the energy as interference and can cancel the interference caused by the energy.

A method for generating the precoding matrix P (specifically, the $i^{th}$ column of the precoding matrix P) that can enable the energy, of the $i^{th}$ layer of the data stream on which the precoding processing has been performed, on the spatial domain resource corresponding to the zero element in the $i^{th}$ first element sequence (that is, the $i^{th}$ column of the signature matrix S) corresponding to the $i^{th}$ layer of the data stream to be zero or approximate to zero is described below in detail.

Optionally, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the transmit end device; and the determining, by the transmit end device, a precoding matrix P according to a channel matrix H and the signature matrix S includes:

generating a first intermediate matrix according to a quantity K of non-zero elements and locations of the non-zero elements in an $i^{th}$ first element sequence included in the signature matrix S, where the first intermediate matrix includes K second element sequences of the R second element sequences; and generating a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and I belongs to [1, L];

performing singular value decomposition processing on the second intermediate matrix, to determine a null subspace of the second intermediate matrix;

determining a third intermediate matrix according to the null subspace of the second intermediate matrix and the first intermediate matrix;

performing singular value decomposition processing on the third intermediate matrix, to determine an orthogonal subspace of the third intermediate matrix; and determining an $i^{th}$ second element sequence of the precoding matrix P according to the orthogonal subspace of the third intermediate matrix and the null subspace of the second intermediate matrix.

In the present invention, methods for generating all columns (that is, the second element sequences) in the precoding matrix P are similar. To avoid repetition, in the following description, a process of generating a first column (that is, a first second element sequence in the first dimensional direction) in the precoding matrix P is used as an example for description. In addition, by way of example but not limitation, a generation process performed when R=4 (that is, the quantity of the antennas used when the terminal device receives the L-layer data is 4), L=6 (that is, the quantity of layers of the data is 6), and T=8 (that is, the quantity of the antennas used when the network device sends the L-layer data is 8) is used as an example for description.

In this case, the signature matrix S may be represented as:

$$S = \begin{pmatrix} 1 & 0 & 0 & 1 & 0 & 1 \\ 1 & 1 & 0 & 0 & 1 & 0 \\ 0 & 1 & 1 & 1 & 0 & 0 \\ 0 & 0 & 1 & 0 & 1 & 1 \end{pmatrix}.$$

The channel matrix H may be represented as:

$$H = \begin{pmatrix} h_{11} & h_{12} & h_{13} & h_{14} & h_{15} & h_{16} & h_{17} & h_{18} \\ h_{21} & h_{22} & h_{23} & h_{24} & h_{25} & h_{26} & h_{27} & h_{28} \\ h_{31} & h_{32} & h_{33} & h_{34} & h_{35} & h_{36} & h_{37} & h_{38} \\ h_{41} & h_{42} & h_{43} & h_{44} & h_{45} & h_{46} & h_{47} & h_{48} \end{pmatrix}$$

Specifically, when i=1, the network device may determine the first column (that is, the first element sequence in the first dimensional direction) of the signature matrix S, that is:

$$\begin{bmatrix} 1 \\ 1 \\ 0 \\ 0 \end{bmatrix}.$$

Subsequently, the network device may determine a first intermediate matrix $H_1$ used to generate the first column (that is, the first second element sequence in the first dimensional direction) of the precoding matrix P. A quantity of rows (that is, second element sequences in the second dimensional direction) included in the first intermediate matrix $H_1$ is the same as a quantity of non-zero elements in the first column of the signature matrix S, and is 2 herein. In addition, the two rows included in the first intermediate matrix $H_1$ may be rows that are in the channel matrix H and that correspond to non-zero elements in the first column of the signature matrix S.

Similarly, the network device may determine a second intermediate matrix $H_1^{\%}$ used to generate the first column (that is, the first second element sequence in the first dimensional direction) of the precoding matrix P. A quantity of rows (that is, the second element sequences in the second dimensional direction) included in the second intermediate matrix $H_1^{\%}$ is the same as a quantity of zero elements in the first column of the signature matrix S, and as described above, is 2 herein. In addition, the two rows included in the second intermediate matrix $H_1^{\%}$ may be rows that are in the channel matrix H and that correspond to zero elements in the first column of the signature matrix S.

Optionally, the generating a first intermediate matrix according to a quantity K of non-zero elements and locations of the non-zero elements in an $i^{th}$ first element sequence included in the signature matrix S includes:

generating the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and the generating a second intermediate matrix according to a quantity M of zero elements and locations of the zero elements in the $i^{th}$ first element sequence included in the signature matrix S includes:

generating the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

Specifically, in implementation of the present invention, the signature matrix S and the channel matrix H both have R element sequences in the second dimensional direction, for example, have R rows. In addition, the rows in the channel matrix H and the rows in the signature matrix S may have the following correspondence:

in the signature matrix S and the channel matrix H, rows having a same arrangement location (or a sequence number) correspond to each other. For example, an $r^{th}$ row in the signature matrix S corresponds to an $r^{th}$ row in the channel matrix H, where r∈(1, R).

It should be understood that the above listed correspondence between the R rows of the signature matrix S and the R rows of the channel matrix H are merely an example for description, and the present invention is not limited thereto, provided that it can be ensured that the network device and the terminal device use a same rule to determine the one-to-one correspondence between the R rows of the signature matrix S and the R rows of the channel matrix H.

In this case, R=4, T=8, L=6, i=1, and K=2.

In addition, the non-zero elements in the first column of the signature matrix S are the first (k=1) element and the second (k=2) element in the first column of the signature matrix S. Therefore, the network device may select rows that are in the channel matrix H and that correspond to the first element and the second element in the first column of the signature matrix S, that is, the first row and the second row of the channel matrix H form the first intermediate matrix $H_1$ (the first intermediate matrix $H_1$ for short below) for the first column of the signature matrix S, that is:

$$H_1 = \begin{bmatrix} h_{11} & h_{12} & h_{13} & h_{14} & h_{15} & h_{16} & h_{17} & h_{18} \\ h_{21} & h_{22} & h_{23} & h_{24} & h_{25} & h_{26} & h_{27} & h_{28} \end{bmatrix}$$

Similarly, the zero elements in the first column of the signature matrix S are the third (m=3) element and the fourth (m=4) element in the first column of the signature matrix S. Therefore, the third row and the fourth row in the channel matrix H may be selected to form the second intermediate matrix $H_1^{\%}$ (the second intermediate matrix $H_1^{\%}$ for short below) in the first column of the signature matrix S, that is:

$$H_1^{\%} = \begin{bmatrix} h_{31} & h_{32} & h_{33} & h_{34} & h_{35} & h_{36} & h_{37} & h_{38} \\ h_{41} & h_{42} & h_{43} & h_{44} & h_{45} & h_{46} & h_{47} & h_{48} \end{bmatrix}$$

Subsequently, the network device may perform singular value decomposition processing on the second intermediate matrix $H_1^{\%}$, to determine a null subspace $V_1^{\%(0)}$ of the second intermediate matrix $H_1^{\%}$. In addition, the process may be similar to a method for performing singular value decomposition processing on a matrix to determine a null space of the matrix in the prior art.

The null subspace $V_1^{\%(0)}$ of the second intermediate matrix $H_1^{\%}$ is a matrix with a size of eight rows and six columns, and a quantity being 8 of rows of $V_1^{\%(0)}$ is determined according to a quantity of columns of $H_1^{\%}$.

In addition, the network device may determine a third intermediate matrix $H_1 V_1^{\%(0)}$ (the third intermediate matrix $H_1 H_1^{\%(0)}$ for short below) for the first column of the signature matrix S according to the first intermediate matrix $H_1$ and the determined null subspace $V_1^{\%(0)}$ of the second intermediate matrix $H_1^{\%}$.

The third intermediate matrix $H_1 V_1^{\%(0)}$ is a matrix that is determined after the network device performs matrix multiplication processing on the first intermediate matrix $H_1$ and the null subspace $V_1^{\%(0)}$ of the second intermediate matrix $H_1^{\%}$ and that has a size of two rows and six columns.

Subsequently, the network device may perform singular value decomposition processing on the third intermediate matrix $H_1 V_1^{\%(0)}$, to determine an orthogonal subspace $V_1^{(1)}$ of the third intermediate matrix $H_1 V_1^{\%(0)}$. In addition, the process may be similar to a method for performing singular value decomposition processing on a matrix to determine an orthogonal subspace of the matrix in the prior art. To avoid repetition, detailed description is omitted herein.

The orthogonal subspace $V_1^{(1)}$ of the third intermediate matrix $H_1 V_1^{\%(0)}$ is a matrix with a size of six rows and two columns, and a quantity being 6 of rows of $V_1^{(1)}$ is determined according to a quantity of columns of $H_1 V_1^{\%(0)}$.

Optionally, the determining an $i^{th}$ second element sequence of the precoding matrix P according to the orthogonal subspace of the third intermediate matrix and the null subspace of the second intermediate matrix includes:

determining a target sequence from the orthogonal subspace of the third intermediate matrix according to a maximum value of multiple singular values that are obtained by performing the singular value decomposition processing on the third intermediate matrix; and determining the $i^{th}$ second element sequence of the precoding matrix P according to the target sequence and the null subspace of the second intermediate matrix.

Specifically, the network device may determine a column corresponding to a relatively large singular value from the orthogonal subspace $V_1^{(1)}$ as an element sequence $q_1$ (that is, an example of the target sequence, the element sequence $q_1$ for short below) corresponding to the first column of the signature matrix S. The element sequence $q_1$ is an element sequence including six elements. Further, the network device may determine that the element sequence $V_1^{\%(0)} q_1$ is an element sequence used to determine a column (that is, a first column of the precoding matrix P) that is in the precoding matrix P and that corresponds to the first column of the signature matrix S. The element sequence $V_1^{\%(0)} q_1$ is a sequence that is determined after the network device performs matrix multiplication processing on the null subspace $V_1^{\%(0)}$ of the second intermediate matrix $H_1^{\%}$ and the element sequence $q_1$ and that includes six elements.

Similarly, the network device may determine element sequences: $V_2^{\%(0)} q_2$, $V_3^{\%(0)} q_3$, $V_4^{\%(0)} q_4$, $V_5^{\%(0)} q_5$, and $V_6^{\%(0)} q_6$.

It should be understood that the above listed method for determining the element sequence $q_1$ is merely an example for description. The present invention is not limited thereto. Another method for obtaining, based on singular value decomposition processing, the orthogonal subspace and determining the element sequence $q_1$ from the orthogonal subspace falls within another protection scope of the present invention.

Optionally, the determining, by the transmit end device, a precoding matrix P according to a channel matrix H and the signature matrix S includes:

determining, by the transmit end device, the precoding matrix P according to the channel matrix H, the signature matrix S, and a power allocation matrix D, where the power allocation matrix D is used for power allocation among the L layers of the data stream.

Specifically, the terminal device may determine that the precoding matrix P is:

$$P = (V_1^{\%(0)} q_1, V_2^{\%(0)} q_2, V_3^{\%(0)} q_3, V_4^{\%(0)} q_4, V_5^{\%(0)} q_5, V_6^{\%(0)} q_6)_D$$

D is a diagonal matrix used for power allocation, and may be set according to an actual requirement. In addition, a setting method may be similar to a method in the prior art. To avoid repetition, detailed description is omitted herein.

It should be understood that the above listed method for determining the precoding matrix P is merely an example for description. The present invention is not limited thereto. For example, if by default same power is allocated to the L layers of the data stream, the power allocation matrix D may not be applicable.

Subsequently, the transmit end device may perform precoding processing on the L-layer data stream according to the determined precoding matrix P. For example, a column vector $$\begin{pmatrix} x_1 \\ x_2 \\ x_3 \\ x_4 \\ x_5 \\ x_6 \end{pmatrix}$$

may be determined according to the foregoing six-layer data stream.

$x_1$ indicates a data stream (for example, the first layer of the data stream) corresponding to the first column of the precoding matrix P; $x_2$ indicates a data stream (for example, the second layer of the data stream) corresponding to the second column of the precoding matrix P; $x_3$ indicates a data stream (for example, the third layer of the data stream) corresponding to the third column of the precoding matrix P; $x_4$ indicates a data stream (for example, the fourth layer of the data stream) corresponding to the fourth column of the precoding matrix P; $x_5$ indicates a data stream (for example, the fifth layer of the data stream) corresponding to the fifth column of the precoding matrix P; $x_6$ indicates a data stream (for example, the sixth layer of the data stream) corresponding to the sixth column of the precoding matrix P.

In addition, the network device performs matrix multiplication processing on the precoding matrix P and the column vector.

It should be understood that the above listed precoding processing method is merely an example for description. The present invention is not limited thereto. For example, processing (for example, multiplication) may be respectively performed, according to the columns of the generated precoding matrix P, on the layers of the data stream that correspond to the columns, and obtained results are superposed.

Therefore, the layers of the data stream on which the precoding processing has been performed may be sparsely distributed on R spatial domain resources, that is, the $i^{th}$ layer of the data stream is carried only on the spatial domain resource corresponding to the non-zero element in the $i^{th}$ column (that is, an example of the $i^{th}$ first element sequence of the signature matrix S) of the signature matrix S, and capacity distribution, of the $i^{th}$ layer of the data stream, on the spatial domain resource corresponding to the zero element in the $i^{th}$ column of the signature matrix S is zero or approximates to zero.

Figure 3:
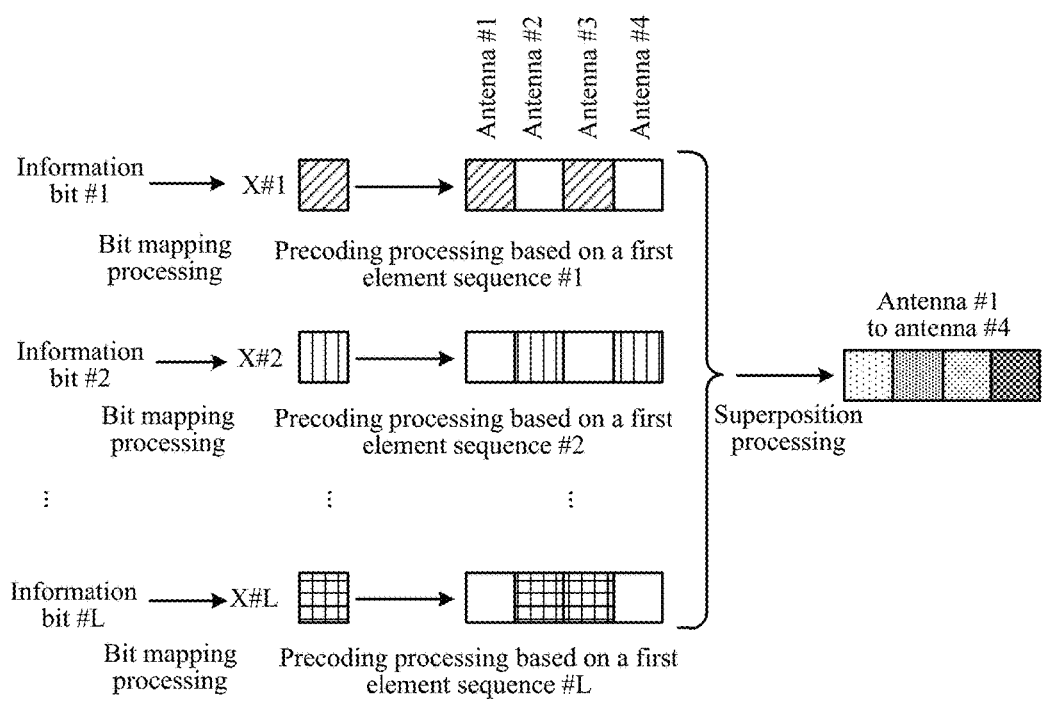
FIG. 3 is a schematic diagram of a processing process of a data transmission method according to an embodiment of the present invention.

FIG. 3 shows a schematic diagram of a processing process of the method 200. As shown in FIG. 3, after the mapping processing is performed on the L-layer information bit (that is, an information bit #1 to an information bit #L), a modulation symbol sequence X#1 to a modulation symbol sequence X#L that respectively correspond to the information bit #1 to the information bit #L are generated. The modulation symbol sequence X#1 to the modulation symbol sequence X#L correspond to a same time-frequency resource, for example, a same RE. After precoding processing is performed, based on the columns (that is, a first element sequence #1 to a first element sequence #L) of the generated precoding matrix P, on the modulation symbol sequence X#1 to the modulation symbol sequence X#L, the modulation symbol sequences are sparsely distributed on a spatial domain resource (that is, an antenna #1 to an antenna #4) used by the receive end device. It needs to be noted that a quantity of the spatial domain resources and a quantity of the time-frequency resources are merely examples for description. The present invention is not limited thereto.

The network device may send, to the terminal device by using the T spatial domain resources, the L-layer data stream on which the precoding processing has been performed.

In addition, the network device may send, to the terminal device, the information indicating the signature matrix S.

Herein, in this embodiment of the present invention, multiple same signature matrices may be stored in the network device and the terminal device, and the multiple signature matrices are indexed according to a same rule. For example, a same index number is allocated to a same signature matrix. Therefore, the network device may send an index number of the signature matrix S to the terminal device.

It needs to be noted that in this embodiment of the present invention, the information indicating the signature matrix S may be carried in a data packet of the L-layer data stream, or may be sent independent of the L-layer data stream. This is not particularly limited in the present invention.

An embodiment of the data transmission method in the present invention is described below with reference to an implementation process: The transmit end device performs precoding on an l-layer data stream according to the precoding matrix P. It is set that a quantity of layers of the data stream is l, the data stream on which the precoding has not been performed is denoted as $$\begin{bmatrix} x^{(0)}(i) \\ \vdots \\ x^{(l-1)}(i) \end{bmatrix},$$

and the data stream on which the precoding processing has been performed is denoted as $$\begin{bmatrix} y^{(0)}(i) \\ \vdots \\ y^{(t-1)}(i) \end{bmatrix}.$$

Therefore:

$$\begin{bmatrix} y^{(0)}(i) \\ M \\ y^{(t-1)}(i) \end{bmatrix} = P(i) \begin{bmatrix} x^{(0)}(i) \\ M \\ x^{(l-1)}(i) \end{bmatrix}.$$

Herein, P(i) is a matrix with a size of [t, l]. t is a quantity of transmit antennas used by the transmit end device to send the l-layer data stream; $V_j^{\%(0)} q_j$ is a matrix with a size of $[t, t-(r-d_j)]$; $q_j$ is a matrix with a size of $[t-(r-d_j), 1]$; r is a quantity of receive antennas used by the receive end device to receive the l-layer data stream; $d_j$ is a quantity of non-zero elements in a $j^{th}$ column of the matrix q; D is a diagonal matrix used for power allocation among the layers of the data stream, where D is optional.

$q_j$ is a $t^{th}$ column of $V_j$, and t is an index of a maximum value of a matrix $\Sigma_j$.

In addition, $\Sigma_j$ and $V_j$ may be obtained by performing singular value decomposition processing on $H_j V_j^{\%(0)}$, that is:

$$H_j V_j^{\%(0)} = U_j \begin{pmatrix} \sum_j & 0 \\ 0 & 0 \end{pmatrix} V_j^H$$

$$H_j V_j^{\%(0)} = U_j \begin{pmatrix} \sum_j & 0 \\ 0 & 0 \end{pmatrix} V_j^H$$

is a matrix with a size of $[d_j, t-(r-d_j)]$.

$V_j^{\%(0)}$ is the $t-(r-d_j)$ columns following $V_j^{\%}$, and corresponds to $t-(r-d_j)$ minimum singular values of $H_j^{\%}$. $V_j^{\%(0)}$ is a null subspace of $H_j^{\%}$. $V_j^{\%}$ may be obtained by performing singular value decomposition processing on $H_j^{\%}$, that is:

$$V_j^{\%} = \left( V_j^{\%(1)}, V_j^{\%(0)} \right)$$

$$H_j^\% = U_j^\% \begin{pmatrix} \sum_j^\% & 0 \\ 0 & 0 \end{pmatrix} V_j^{\%H}$$

$H_1 \sim H_l$ and $H_1^\% \sim H_l^\%$ may be obtained according to a matrix H and a matrix S.

That is, it is assumed that $ind(1), \ldots,$ and $ind(d_j)$ indicate index numbers of non-zero elements (that is, "1") in a $j^{th}$ column of the matrix S, and $H_1$ corresponds to an $ind(1)^{th}$ column, $\ldots,$ and an $ind(d_j)^{th}$ column of the matrix H. $H_j$ is a matrix with a size of $[d_j, t]$.

It is assumed that $ind(1), \ldots,$ and $ind(r-d_j)$ indicate index numbers of zero elements (that is, "0") in the $j^{th}$ column of the matrix S, and $H_j^\%$ corresponds to the $ind(1)^{th}$ column, $\ldots,$ and the $ind(r-d_j)^{th}$ column of the matrix H. $H_j^\%$ is a matrix with a size of $[r-d_j, t]$.

The matrix S is a signature matrix with a size of $[r, l]$. 0's or 1's are elements of the matrix, and a quantity of 1's in the $j^{th}$ column of the matrix S is $d_j$.

For example, it is set that r=4, and l=6. In this case, the matrix S may be represented as:

$$S = \begin{pmatrix} 1 & 0 & 1 & 0 & 1 & 0 \\ 0 & 1 & 1 & 0 & 0 & 1 \\ 1 & 0 & 0 & 1 & 0 & 1 \\ 0 & 1 & 0 & 1 & 1 & 0 \end{pmatrix}.$$

For another example, it is set that r=4, and l=6. In this case, the matrix S may be represented as:

$$S = \begin{pmatrix} 1 & 0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 \\ 0 & 0 & 1 & 0 & 0 & 0 & 1 & 0 & 0 & 1 & 0 & 0 & 1 & 0 & 0 & 0 & 0 & 1 & 0 & 0 & 0 & 1 & 0 \\ 1 & 0 & 0 & 0 & 0 & 0 & 1 & 0 & 0 & 0 & 1 & 0 & 0 & 0 & 1 & 0 & 0 & 1 & 0 & 0 & 0 & 0 & 0 & 1 \\ 0 & 0 & 1 & 0 & 1 & 0 & 0 & 0 & 0 & 0 & 1 & 0 & 0 & 1 & 0 & 0 & 0 & 0 & 1 & 0 & 1 & 0 & 0 \\ 0 & 1 & 0 & 0 & 0 & 1 & 0 & 0 & 1 & 0 & 0 & 0 & 0 & 1 & 0 & 0 & 0 & 1 & 0 & 0 & 0 & 1 & 0 & 0 \\ 0 & 0 & 0 & 1 & 0 & 0 & 0 & 1 & 0 & 1 & 0 & 0 & 0 & 1 & 0 & 0 & 0 & 0 & 0 & 1 & 0 & 0 & 0 & 1 \\ 0 & 1 & 0 & 0 & 0 & 0 & 0 & 1 & 0 & 0 & 1 & 0 & 0 & 0 & 0 & 1 & 1 & 0 & 0 & 0 & 0 & 0 & 1 & 0 \\ 0 & 0 & 0 & 1 & 0 & 1 & 0 & 0 & 0 & 0 & 0 & 1 & 0 & 0 & 0 & 1 & 0 & 0 & 1 & 0 & 1 & 0 & 0 & 0 \end{pmatrix}$$

Certainly, r and l may be other values.

In the embodiment of data transmission of the implementation process described in the foregoing, forms of expression of all parameters may be various, and letters may be replaced with other letters.

Although the embodiment of data transmission of the implementation process described in the foregoing is presented in a method manner, a technical feature of the embodiment is also applicable to an apparatus embodiment. The precoding on the l-layer data stream according to the precoding matrix P may be performed by a processing unit or a processor. The apparatus embodiment is not described in detail again.

Receiving processing that is performed by the terminal device (that is, an example of the receive end device) on data sent by the network device is described in detail below.

Specifically, the terminal device may receive the L-layer data stream and the information indicating the signature matrix S, and determine sparse distribution of the layers of the data stream on the R spatial domain resources. Therefore, the terminal device may obtain, by means of demodulation, the L-layer data stream according to the sparse distribution, and obtain, by means of demodulation and according to the preset constellation point set, the L-layer information bit corresponding to the L-layer data stream.

For example, the terminal device may calculate, according to the following formula 1, the L-layer data stream to be demodulated:

$$y = HPx + n \quad \text{formula 1}$$

y indicates data (or, a signal) received by the terminal device.

HP corresponds to the channel between the network device and the terminal device and the precoding matrix P. The terminal device may determine a specific value of HP according to channel estimation based on a pilot signal.

n indicates white noise, and a method for determining n is similar to a method in the prior art. To avoid repetition, detailed description is omitted herein.

x indicates the L-layer data stream to be demodulated.

In this embodiment of the present invention, the terminal device may perform message passing algorithm (MPA, Message Passing Algorithm) iterative processing on x by using a codebook, to obtain the L-layer bit information by means of demodulation.

The codebook includes two or more codewords. The codebook may indicate a mapping relationship between possible data combinations of data having a given length and the codewords in the codebook.

The codeword may be a multi-dimensional complex field vector, which has two or more dimensions and is used to indicate a mapping relationship between data and two or more modulation symbols. The modulation symbols include at least one zero modulation symbol and at least one non-zero modulation symbol, and the data may be binary-bit data or n-ary data. Optionally, a relationship between the zero modulation symbol and the non-zero modulation symbol may be that a quantity of zero modulation symbols is not less than a quantity of non-zero modulation symbols.

The codebook includes two or more codewords. The codebook may indicate a mapping relationship between possible data combinations of data having a given length and the codewords in the codebook. In addition, codewords included in a same codebook may be different.

In this embodiment of the present invention, a location of the zero demodulation symbol in the codebook may be determined according to a location of the zero element in the signature matrix S. In addition, a value of the non-zero modulation symbol in the codebook may be determined according to a value of a modulation symbol in the constellation point set, so as to determine the codebook, and further to implement demodulation based on the MPA iterative processing. In addition, a manner based on the MPA iterative processing is similar to that in the prior art. To avoid repetition, detailed description is omitted herein.

It should be understood that the above listed demodulation method of the terminal device is merely an example for description. The present invention is not limited thereto. Another method for performing demodulation by using quantity sparsity on a transmission resource falls within the protection scope of the present invention.

Optionally, the quantity L of layers of the data stream is greater than the quantity R of the receive antennas.

Specifically, in the prior art, in a technology such as multiple-input multiple-output (MIMO, Multiple-Input Multiple-Output) in the prior art, one spatial domain resource (for example, one antenna) can be used to receive only one layer of the data stream. Therefore, the quantity of layers of the data stream needs to be less than or equal to the quantity of the antennas used by the receive end.

By contrast, in this embodiment of the present invention, the receive end device may obtain the L-layer data stream by means of demodulation according to the sparse distribution of the L layers of the data stream on the R spatial domain resources. Therefore, the quantity L of layers of the data stream may be greater than the quantity R of the receive antennas, so as to overcome a limitation in the prior art. If a data stream having a same quantity of layers is transmitted, a requirement on a quantity of antennas is lowered, and hardware costs are greatly reduced, so as to facilitate implementation of device miniaturization.

In this embodiment of the present invention, there may be one or more receive end devices. This is not particularly limited in the present invention. When there are multiple receive end devices, for a target receive end device, if only some layers of the data in the L layers of the data are sent to the target receive end device, the transmit end device may further send, to the target receive end device, indication information indicating locations of the some layers of the data. Therefore, the target receive end device can obtain, based on the indication information, useful data from the L layers of the data.

According to the data transmission method in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

FIG. 4 shows a schematic flowchart of a data transmission method 300 from the perspective of a receive end device according to an embodiment of the present invention. As shown in FIG. 4, the method 300 includes the following steps.

S310: A receive end device receives data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the receive end device, and the precoding matrix P includes L second element sequences arranged in the first dimensional direction.

S320: The receive end device performs, according to the signature matrix S and the constellation point set, demodulation processing on the L-layer data stream on which the precoding processing has been performed, to obtain the L-layer bit information.

Optionally, the performing, by the receive end device according to the signature matrix S and the constellation point set, demodulation processing on the L-layer data stream on which the precoding processing has been performed includes:

performing, by the receive end device, channel estimation to determine data to be demodulated that is based on the L-layer data stream on which the precoding processing has been performed;

determining, by the receive end device, a codebook according to the signature matrix S and the constellation point set; and performing, by the receive end device according to the codebook, message passing algorithm MPA iterative processing on the data to be demodulated.

Optionally, the transmit end device is a network device, and the receive end device is a terminal device.

Alternatively, the transmit end device is a terminal device, and the receive end device is a network device.

Actions of the transmit end device in the method 300 are similar to actions of the transmit end device in the method 200. In addition, actions of the receive end device in the method 300 are similar to actions of the receive end device in the method 200. To avoid repetition, detailed description is omitted herein.

According to the data transmission method in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

The data transmission methods in the embodiments of the present invention are described in detail above with reference to FIG. 1 to FIG. 4. Data processing apparatuses according to embodiments of the present invention are described in detail below with reference to FIG. 5 and FIG. 6.

Figure 5:
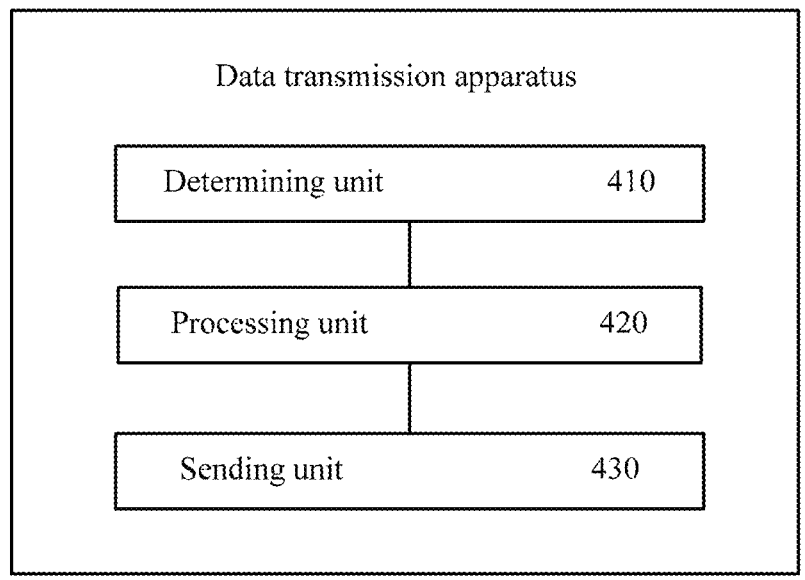
FIG. 5 is a schematic structural diagram of a data transmission apparatus according to an embodiment of the present invention.

FIG. 5 shows a schematic block diagram of a data transmission apparatus 400 according to an embodiment of the present invention. As shown in FIG. 5, the apparatus 400 includes:

a determining unit 410, configured to: determine a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, R≥2, the L first element sequences are different from each other, the L layers of the data stream correspond to a same time-frequency resource, and L≥2; and determine a precoding matrix P according to a channel matrix H and the signature matrix S;

a processing unit 420, configured to perform precoding processing on the L-layer data stream according to the precoding matrix P, where the channel matrix H corresponds to channels between the apparatus and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream; and a sending unit 430, configured to send, to the receive end device, the L-layer data stream on which the precoding processing has been performed and information used to indicate the signature matrix S.

Optionally, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the apparatus.

The determining unit is specifically configured to: generate a first intermediate matrix according to a quantity K of non-zero elements and locations of the non-zero elements in an $i^{th}$ first element sequence included in the signature matrix S, where the first intermediate matrix includes K second element sequences of the R second element sequences;

generate a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and i belongs to [1, L];

perform singular value decomposition processing on the second intermediate matrix, to determine a null subspace of the second intermediate matrix;

determine a third intermediate matrix according to the null subspace of the second intermediate matrix and the first intermediate matrix;

perform singular value decomposition processing on the third intermediate matrix, to determine an orthogonal subspace of the third intermediate matrix; and determine an $i^{th}$ second element sequence of the precoding matrix P according to the orthogonal subspace of the third intermediate matrix and the null subspace of the second intermediate matrix.

Optionally, the determining unit is specifically configured to: determine a target sequence from the orthogonal subspace of the third intermediate matrix according to a maximum value of multiple singular values that are obtained by performing the singular value decomposition processing on the third intermediate matrix; and determine the $i^{th}$ second element sequence of the precoding matrix P according to the target sequence and the null subspace of the second intermediate matrix.

Optionally, the determining unit is specifically configured to determine the precoding matrix P according to the channel matrix H, the signature matrix S, and a power allocation matrix D, where the power allocation matrix D is used for power allocation among the L layers of the data stream.

Optionally, the determining unit is specifically configured to: generate the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and generate the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

Optionally, the determining unit is specifically configured to determine, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

Optionally, the quantity L of layers of the data stream is greater than the quantity R of the receive antennas.

Optionally, a value of the non-zero element is 1.

Optionally, the apparatus is a network device, and the receive end device is a terminal device.

Alternatively, the apparatus is a terminal device, and the receive end device is a network device.

The data transmission apparatus 400 in this embodiment of the present invention may correspond to the transmit end device (for example, a network device or a terminal device) in the method of the embodiment of the present invention. In addition, units, that is, modules, in the data transmission apparatus 400 and the foregoing other operations and/or functions are respectively intended to implement corresponding procedures of the method 200 in FIG. 2. For concision, details are not described herein again.

According to the data transmission apparatus in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

Figure 6:
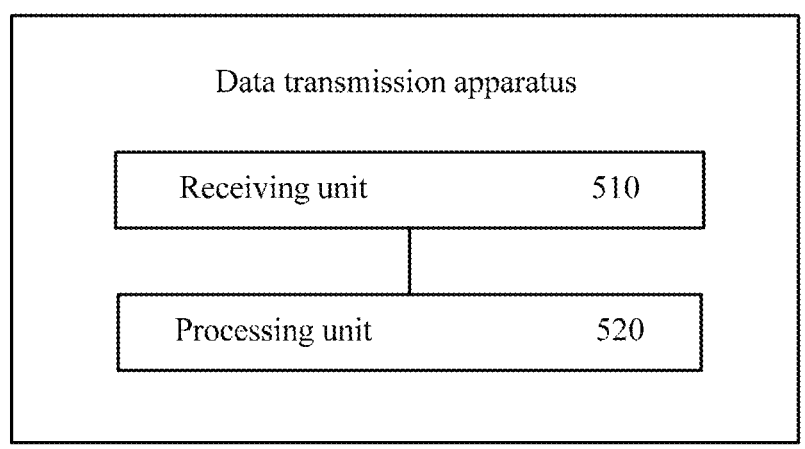
FIG. 6 is a schematic structural diagram of a data transmission apparatus according to another embodiment of the present invention.

FIG. 6 shows a schematic block diagram of a data transmission apparatus 500 according to an embodiment of the present invention. As shown in FIG. 6, the apparatus 500 includes:

a receiving unit 510, configured to receive data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the apparatus, and the precoding matrix P includes L second element sequences arranged in the first dimensional direction; and a processing unit 520, configured to perform, according to the signature matrix S and the constellation point set, demodulation processing on the L-layer data stream on which the precoding processing has been performed, to obtain the L-layer bit information.

Optionally, the processing unit is specifically configured to: perform channel estimation to determine data to be demodulated that is based on the L-layer data stream on which the precoding processing has been performed;

determine a codebook according to the signature matrix S and the constellation point set; and perform, according to the codebook, message passing algorithm MPA iterative processing on the data to be demodulated.

Optionally, the codebook includes two or more codewords, the codewords may be a multi-dimensional complex field vector, and are used to indicate a mapping relationship between data and two or more modulation symbols, and the modulation symbols include at least one zero modulation symbol and at least one non-zero modulation symbol.

Optionally, the transmit end device is a network device, and the apparatus is a terminal device.

Alternatively, the transmit end device is a terminal device, and the apparatus is a network device.

The data transmission apparatus 500 according to this embodiment of the present invention may correspond to the receive end device (for example, a network device or a terminal device) in the method of the embodiment of the present invention. In addition, units, that is, modules, in the data transmission apparatus 500 and the foregoing other operations and/or functions are respectively intended to implement corresponding procedures of the method 300 in FIG. 4. For concision, details are not described herein again.

According to the data transmission apparatus in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

The data transmission methods in the embodiments of the present invention are described in detail above with reference to FIG. 1 to FIG. 4. Data processing devices according to embodiments of the present invention are described in detail below with reference to FIG. 7 and FIG. 8.

Figure 7:
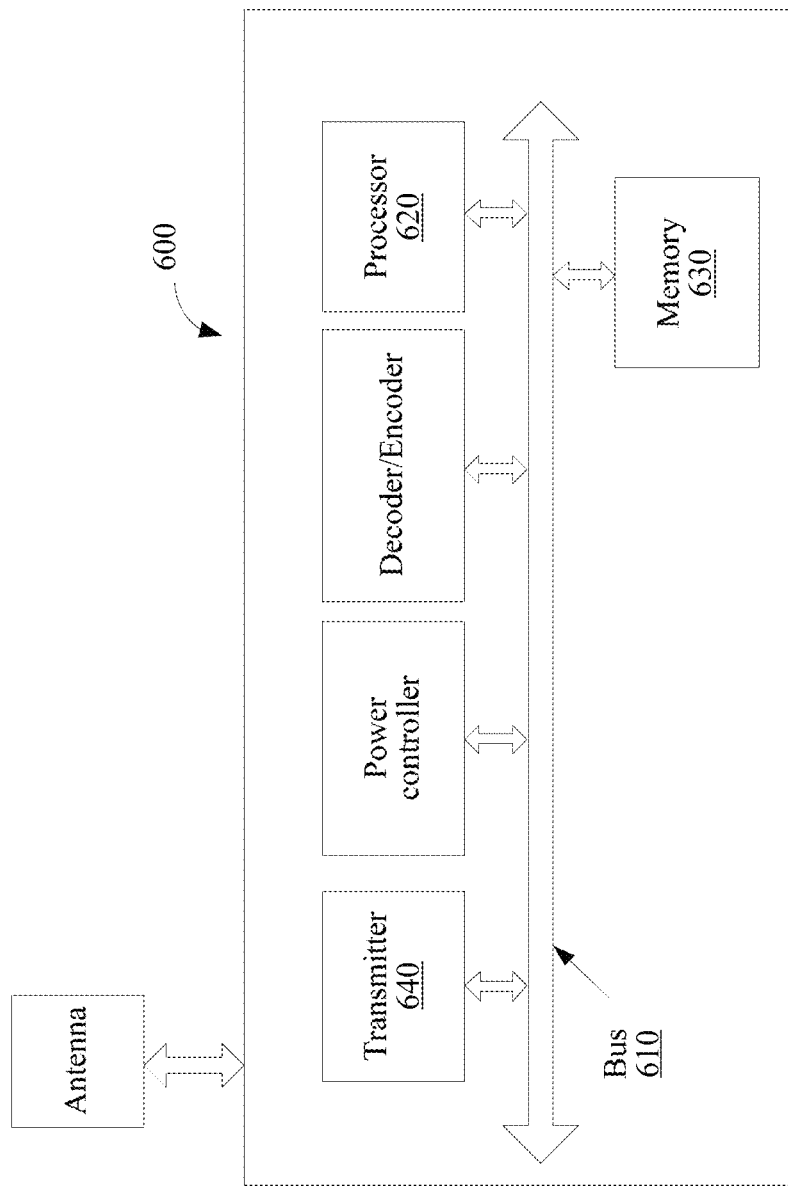
FIG. 7 is a schematic structural diagram of a data transmission device according to an embodiment of the present invention.

FIG. 7 shows a schematic block diagram of a data transmission device 600 according to an embodiment of the present invention. As shown in FIG. 7, the device 600 includes:

a bus 610;
a processor 620 connected to the bus;
a memory 630 connected to the bus; and
a transmitter 640 connected to the bus.

The processor calls, by using the bus, a program stored in the memory, so as to: determine a signature matrix S according to a quantity L of layers of a data stream and a quantity R of receive antennas used by a receive end device, where the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with the R receive antennas, the R first elements include at least one zero element and at least one non-zero element, $R \geq 2$, the L first element sequences are different from each other, the L layers of the data stream correspond to a same time-frequency resource, and $L \geq 2$;

determine a precoding matrix P according to a channel matrix H and the signature matrix S, and perform precoding processing on the L-layer data stream according to the precoding matrix P, where the channel matrix H corresponds to channels between the device 600 and the receive end device, the precoding matrix P includes L second element sequences arranged in the first dimensional direction, the L second element sequences are in one-to-one correspondence with the L first element sequences, and the L second element sequences are in one-to-one correspondence with the L layers of the data stream; and control the transmitter to send, to the receive end device, the L-layer data stream on which the precoding processing has been performed and information used to indicate the signature matrix S.

Optionally, the channel matrix H includes R second element sequences arranged in the second dimensional direction, each second element sequence includes T second elements arranged in the first dimensional direction, the R second element sequences are in one-to-one correspondence with the R receive antennas used by the receive end device, and the T second element sequences are in one-to-one correspondence with T transmit antennas used by the device.

The processor is specifically configured to: generate a first intermediate matrix according to a quantity K of non-zero elements and locations of the non-zero elements in an $i^{th}$ first element sequence included in the signature matrix S, where the first intermediate matrix includes K second element sequences of the R second element sequences;

generate a second intermediate matrix according to a quantity M of zero elements and locations of the zero elements in the $i^{th}$ first element sequence included in the signature matrix S, where the second intermediate matrix includes M second element sequences of the R second element sequences, the K second element sequences are different from the M second element sequences, M=R−K, and i belongs to [1, L];

perform singular value decomposition processing on the second intermediate matrix, to determine a null subspace of the second intermediate matrix;

determine a third intermediate matrix according to the null subspace of the second intermediate matrix and the first intermediate matrix;

perform singular value decomposition processing on the third intermediate matrix, to determine an orthogonal subspace of the third intermediate matrix; and determine an $i^{th}$ second element sequence of the precoding matrix P according to the orthogonal subspace of the third intermediate matrix and the null subspace of the second intermediate matrix.

Optionally, the processor is specifically configured to: determine a target sequence from the orthogonal subspace of the third intermediate matrix according to a maximum value of multiple singular values that are obtained by performing the singular value decomposition processing on the third intermediate matrix; and determine the $i^{th}$ second element sequence of the precoding matrix P according to the target sequence and the null subspace of the second intermediate matrix.

Optionally, the processor is specifically configured to determine the precoding matrix P according to the channel matrix H, the signature matrix S, and a power allocation matrix D, where the power allocation matrix D is used for power allocation among the L layers of the data stream.

Optionally, the processor is specifically configured to: generate the first intermediate matrix according to the quantity K of the non-zero elements and the locations of the non-zero elements in the $i^{th}$ first element sequence included in the signature matrix S, where the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and generate the second intermediate matrix according to the quantity M of the zero elements and the locations of the zero elements in the $i^{th}$ first element sequence included in the signature matrix S, where the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

Optionally, the processor is specifically configured to determine, based on a mapping relationship between multiple parameter sets and multiple pre-stored signature matrices, the signature matrix S corresponding to the quantity L of layers and the quantity R from the multiple signature matrices, where each parameter set includes a value of a quantity of layers of a data stream and a value of a quantity of spatial domain resources.

Optionally, the quantity L of layers of the data stream is greater than the quantity R of the receive antennas.

Optionally, a value of the non-zero element is 1.

Optionally, the device is a network device, and the receive end device is a terminal device.

Alternatively, the device is a terminal device, and the receive end device is a network device.

The processor may further be referred to as a CPU. The memory may include a read-only memory and a random access memory, and provide an instruction and data to the processor. A part of the memory may further include a non-volatile random access memory (NVRAM). In specific application, the device 600 may be embedded into a transmit end device (for example, a network device such as a base station, or a terminal device) or may be a transmit end device, and may further include a carrier accommodating a transmitter circuit and a receiver circuit, so as to allow data transmission and reception between the device 600 and a remote location. The transmitter circuit and the receiver circuit may be coupled to an antenna. Components of the device 600 are coupled together by using a bus. The bus may include a power bus, a control bus, and a status signal bus in addition to a data bus. However, for clear description, various buses are marked as the bus in the figure. Specifically, decoders in different products may be integrated with a processing unit.

The processor may implement or perform steps and logical block diagrams disclosed in the method embodiment of the present invention. A general purpose processor may be a microprocessor or the processor may be any conventional processor, decoder, or the like. Steps of the method disclosed with reference to the embodiments of the present invention may be directly performed by a hardware processor, or may be performed by a combination of hardware and software modules in a decoding processor. The software module may be located in a mature storage medium in the field, such as a random access memory, a flash memory, a read-only memory, a programmable read-only memory, an electrically-erasable programmable memory, or a register.

It should be understood that in this embodiment of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor and the like.

The memory may include a read-only memory and a random access memory, and provide an instruction and data to the processor. A part of the memory may further include a non-volatile random access memory. For example, the memory may further store device type information.

The bus system may further include a power bus, a control bus, a status signal bus, and the like in addition to a data bus. However, for clear description, all buses are marked as the bus system in the figure.

In an implementation process, the steps of the foregoing method may be implemented by using a hardware integrated logic circuit in the processor or instructions in a form of software. Steps of the method disclosed with reference to the embodiments of the present invention may be directly performed by a hardware processor, or may be performed by a combination of hardware and software modules in the processor. The software module may be located in a mature storage medium in the field, such as a random access memory, a flash memory, a read-only memory, a programmable read-only memory, an electrically-erasable programmable read-only memory, or a register. The storage medium is located in the memory, and the processor reads information in the memory to complete the steps in the foregoing methods in combination with hardware of the processor. To avoid repetition, details are not described herein again.

The data transmission device 600 according to this embodiment of the present invention may correspond to the transmit end device (for example, a network device or a terminal device) in the method of the embodiment of the present invention. In addition, units, that is, modules, in the data transmission device 600 and the foregoing other operations and/or functions are respectively intended to implement corresponding procedures of the method 200 in FIG. 2. For concision, details are not described herein again.

According to the data transmission device in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

Figure 8:
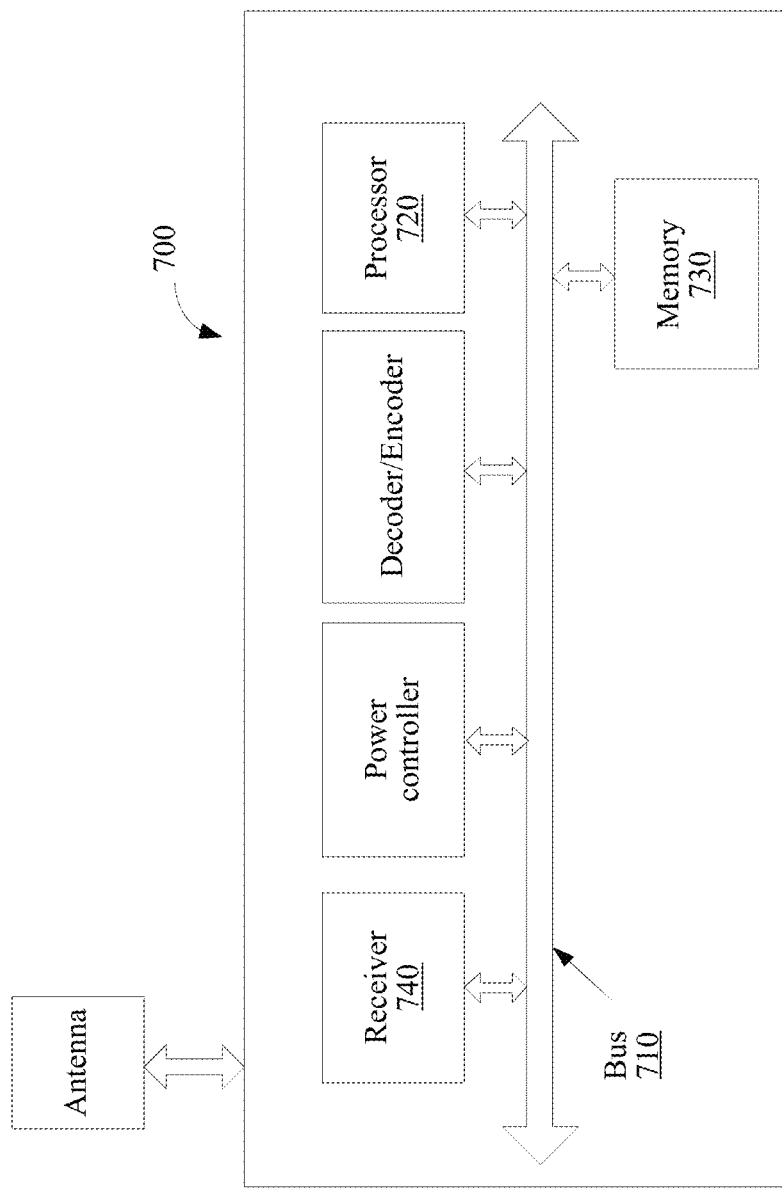
FIG. 8 is a schematic structural diagram of a data transmission device according to another embodiment of the present invention.

FIG. 8 shows a schematic block diagram of a data transmission device 700 according to an embodiment of the present invention. As shown in FIG. 8, the device 700 includes:

a bus 710;

a processor 720 connected to the bus;

a memory 730 connected to the bus; and a receiver 740 connected to the bus.

The processor calls, by using the bus, a program stored in the memory, so as to: control the receiver to receive data and information used to indicate a signature matrix S that are sent by a transmit end device, where the data includes an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S includes L first element sequences arranged in a first dimensional direction, the L first element sequences are in one-to-one correspondence with the L layers of the data stream, each first element sequence includes R first elements arranged in a second dimensional direction, the R first elements are in one-to-one correspondence with R receive antennas, the R first elements include at least one zero element and at least one non-zero element, the precoding processing is performed by the transmit end device according to a channel matrix H and the signature matrix S, the channel matrix H corresponds to channels between the transmit end device and the device 700, and the precoding matrix P includes L second element sequences arranged in the first dimensional direction; and perform, according to the signature matrix S and the constellation point set, demodulation processing on the L-layer data stream on which the precoding processing has been performed, to obtain the L-layer bit information.

Optionally, the processor is specifically configured to: perform channel estimation to determine data to be demodulated that is based on the L-layer data stream on which the precoding processing has been performed;

determine a codebook according to the signature matrix S and the constellation point set; and perform, according to the codebook, message passing algorithm MPA iterative processing on the data to be demodulated.

Optionally, the codebook includes two or more codewords, the codewords may be a multi-dimensional complex field vector, and are used to indicate a mapping relationship between data and two or more modulation symbols, and the modulation symbols include at least one zero modulation symbol and at least one non-zero modulation symbol.

Optionally, the transmit end device is a network device, and the device is a terminal device.

Alternatively, the transmit end device is a terminal device, and the device is a network device.

The processor may further be referred to as a CPU. The memory may include a read-only memory and a random access memory, and provide an instruction and data to the processor. A part of the memory may further include a non-volatile random access memory (NVRAM). During specific application, the device 700 may be embedded into a receive end device (for example, a network device such as a base station, or a terminal device) or may be a receive end device, and may further include a carrier accommodating a transmitter circuit and a receiver circuit, so as to allow data transmission and reception between the device 700 and a remote location. The transmitter circuit and the receiver circuit may be coupled to an antenna. Components of the device 700 are coupled together by using a bus. The bus may include a power bus, a control bus, and a status signal bus in addition to a data bus. However, for clear description, various buses are marked as the bus in the figure. Specifically, decoders in different products may be integrated with a processing unit.

The processor may implement or perform steps and logical block diagrams disclosed in the method embodiment of the present invention. A general purpose processor may be a microprocessor or the processor may be any conventional processor, decoder, or the like. Steps of the method disclosed with reference to the embodiments of the present invention may be directly performed by a hardware processor, or may be performed by a combination of hardware and software modules in a decoding processor. The software module may be located in a mature storage medium in the field, such as a random access memory, a flash memory, a read-only memory, a programmable read-only memory, an electrically-erasable programmable memory, or a register.

It should be understood that in this embodiment of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor and the like.

The memory may include a read-only memory and a random access memory, and provide an instruction and data to the processor. A part of the memory may further include a non-volatile random access memory. For example, the memory may further store device type information.

The bus system may further include a power bus, a control bus, a status signal bus, and the like in addition to a data bus. However, for clear description, all buses are marked as the bus system in the figure.

In an implementation process, the steps of the foregoing method may be implemented by using a hardware integrated logic circuit in the processor or instructions in a form of software. Steps of the method disclosed with reference to the embodiments of the present invention may be directly performed by a hardware processor, or may be performed by a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory to complete the steps in the foregoing methods in combination with hardware of the processor. To avoid repetition, details are not described herein again.

The data transmission device 700 according to this embodiment of the present invention may correspond to the receive end device (for example, a network device or a terminal device) in the method of the embodiment of the present invention. In addition, units, that is, modules, in the data transmission device 700 and the foregoing other operations and/or functions are respectively intended to implement corresponding procedures of the method 300 in FIG. 4. For concision, details are not described herein again.

According to the data transmission device in the present invention, a transmit end device determines a signature matrix S with sparsity according to a quantity of spatial domain resources used by a receive end device and a quantity of layers that are of a multi-layer data stream needing to be transmitted and that correspond to a same time-frequency resource, and generates, based on the signature matrix S, a precoding matrix P, so that distribution, on the spatial domain resource, of the layers of the data stream processed by using the precoding matrix P has sparsity. The receive end device recovers, according to the signature matrix and by using the sparsity of the distribution of the layers of the data stream on the spatial domain resource, the multiple layers of the data stream that correspond to the same time-frequency resource. Therefore, the multi-layer data stream can be transmitted by using the same time-frequency resource, thereby improving efficiency in utilizing the time-frequency resource.

It should be understood that, for the brevity and clarity of the application document, technical features and description in an embodiment in the foregoing are applicable to other embodiments, and are no longer described in detail one by one in the other embodiments.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, wherein the method comprises:
    determining, by a transmit end device, a signature matrix S according to a quantity L of layers of a data stream and a quantity R of receive antennas used by a receive end device, wherein the signature matrix S comprises L first element sequences arranged in a first dimensional direction, the L first element sequences are in one-to-one correspondence with the L layers of the data stream, each first element sequence of the L first element sequences comprises R first elements arranged in a second dimensional direction, the R first elements are in one-to-one correspondence with the R receive antennas, the R first elements comprise at least one zero element and at least one non-zero element, R≥2, the L first element sequences are different from each other, the L layers of the data stream correspond to a same time-frequency resource, and L≥2;
    determining, by the transmit end device, a precoding matrix P according to a channel matrix H and the signature matrix S, and performing precoding processing on the L-layer data stream according to the precoding matrix P, wherein the channel matrix H corresponds to channels between the transmit end device and the receive end device, the precoding matrix P comprises L second element sequences arranged in the first dimensional direction, the L second element sequences are in one-to-one correspondence with the L first element sequences, and the L second element sequences are in one-to-one correspondence with the L layers of the data stream; and
    sending, by the transmit end device to the receive end device, the L-layer data stream on which the precoding processing has been performed and information used to indicate the signature matrix S.

2. The method according to claim 1, wherein the channel matrix H comprises R second element sequences arranged in the second dimensional direction, each second element sequence of the R second element sequences comprises T second elements arranged in the first dimensional direction, the R second element sequences are in one-to-one correspondence with the R receive antennas used by the receive end device, and the T second element sequences are in one-to-one correspondence with T transmit antennas used by the transmit end device; and
    the determining, by the transmit end device, a precoding matrix P according to a channel matrix H and the signature matrix S comprises:
    generating a first intermediate matrix according to a quantity K of non-zero elements and locations of the non-zero elements in an $i^{th}$ first element sequence comprised in the signature matrix S, wherein the first intermediate matrix comprises K second element sequences of the R second element sequences;
    generating a second intermediate matrix according to a quantity M of zero elements and locations of the zero elements in the $i^{th}$ first element sequence comprised in the signature matrix S, wherein the second intermediate matrix comprises M second element sequences of the R second element sequences, the K second element sequences are different from the M second element sequences, M=R−K, and i belongs to [1, L];
    performing singular value decomposition processing on the second intermediate matrix, to determine a null subspace of the second intermediate matrix;
    determining a third intermediate matrix according to the null subspace of the second intermediate matrix and the first intermediate matrix;
    performing singular value decomposition processing on the third intermediate matrix, to determine an orthogonal subspace of the third intermediate matrix; and
    determining an $i^{th}$ second element sequence of the precoding matrix P according to the orthogonal subspace of the third intermediate matrix and the null subspace of the second intermediate matrix.

3. The method according to claim 2, wherein the determining an $i^{th}$ second element sequence of the precoding matrix P according to the orthogonal subspace of the third intermediate matrix and the null subspace of the second intermediate matrix comprises:
    determining a target sequence from the orthogonal subspace of the third intermediate matrix according to a maximum value of multiple singular values that are obtained by performing the singular value decomposition processing on the third intermediate matrix; and
    determining the $i^{th}$ second element sequence of the precoding matrix P according to the target sequence and the null subspace of the second intermediate matrix.

4. The method according to claim 1, wherein the determining, by the transmit end device, a precoding matrix P according to a channel matrix H and the signature matrix S comprises:
    determining, by the transmit end device, the precoding matrix P according to the channel matrix H, the signature matrix S, and a power allocation matrix D, wherein the power allocation matrix D is used for power allocation among the L layers of the data stream.

5. The method according to claim 1, wherein
    the generating a first intermediate matrix according to a quantity K of non-zero elements and locations of the non-zero elements in an $i^{th}$ first element sequence comprised in the signature matrix S comprises:
    generating the first intermediate matrix according to the quantity K of the non-zero elements and the locations of the non-zero elements in the $i^{th}$ first element sequence comprised in the signature matrix S, wherein the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k belongs to [1, K]; and the generating a second intermediate matrix according to a quantity M of zero elements and locations of the zero elements in the $i^{th}$ first element sequence comprised in the signature matrix S comprises:

generating the second intermediate matrix according to the quantity M of the zero elements and the locations of the zero elements in the $i^{th}$ first element sequence comprised in the signature matrix S, wherein the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m [1, M], and M=R−K.

6. The method according to claim 1, wherein the determining, by a transmit end device, a signature matrix S according to a quantity L of layers of a data stream and a quantity R of receive antennas used by a receive end device comprises:

determining, based on a mapping relationship between multiple parameter sets and multiple pre-stored signature matrices, the signature matrix S corresponding to the quantity L of layers and the quantity R from the multiple signature matrices, wherein each parameter set of the multiple parameter sets comprises a value of a quantity of layers of a data stream and a value of a quantity of spatial domain resources.

7. The method according to claim 1, wherein the quantity L of layers of the data stream is greater than the quantity R of the receive antennas.

8. A data transmission method, wherein the method comprises:

receiving, by a receive end device, data and information used to indicate a signature matrix S that are sent by a transmit end device, wherein the data comprises an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S comprises L first element sequences arranged in a first dimensional direction, the L first element sequences are in one-to-one correspondence with the L layers of the data stream, each first element sequence of the L first element sequences comprises R first elements arranged in a second dimensional direction, the R first elements are in one-to-one correspondence with R receive antennas, the R first elements comprise at least one zero element and at least one non-zero element, the precoding processing is performed by the transmit end device according to a channel matrix H and the signature matrix S, the channel matrix H corresponds to channels between the transmit end device and the receive end device, and a precoding matrix P comprises L second element sequences arranged in the first dimensional direction; and performing, by the receive end device according to the signature matrix S and the constellation point set, demodulation processing on the L-layer data stream on which the precoding processing has been performed, to obtain the L-layer bit information.

9. The method according to claim 8, wherein the performing, by the receive end device according to the signature matrix S and the constellation point set, demodulation processing on the L-layer data stream on which the precoding processing has been performed comprises:

performing, by the receive end device, channel estimation to determine data to be demodulated that is based on the L-layer data stream on which the precoding processing has been performed;

determining, by the receive end device, a codebook according to the signature matrix S and the constellation point set; and performing, by the receive end device according to the codebook, message passing algorithm MPA iterative processing on the data to be demodulated.

10. The method according to claim 9, wherein the codebook comprises two or more codewords, the codewords include a multi-dimensional complex field vector, and are used to indicate a mapping relationship between data and two or more modulation symbols, and the modulation symbols comprise at least one zero modulation symbol and at least one non-zero modulation symbol.

11. A data transmission device, wherein the device comprises:

a bus;

a processor connected to the bus;

a memory connected to the bus; and a transmitter connected to the bus, wherein the processor calls, using the bus, a program stored in the memory, so as to: determine a signature matrix S according to a quantity L of layers of a data stream and a quantity R of receive antennas used by a receive end device, wherein the signature matrix S comprises L first element sequences arranged in a first dimensional direction, the L first element sequences are in one-to-one correspondence with the L layers of the data stream, each first element sequence of the L first element sequences comprises R first elements arranged in a second dimensional direction, the R first elements are in one-to-one correspondence with the R receive antennas, the R first elements comprise at least one zero element and at least one non-zero element, R≥2, the L first element sequences are different from each other, the L layers of the data stream correspond to a same time-frequency resource, and L≥2;

determine a precoding matrix P according to a channel matrix H and the signature matrix S, and perform precoding processing on the L-layer data stream according to the precoding matrix P, wherein the channel matrix H corresponds to channels between the device and the receive end device, the precoding matrix P comprises L second element sequences arranged in the first dimensional direction, the L second element sequences are in one-to-one correspondence with the L first element sequences, and the L second element sequences are in one-to-one correspondence with the L layers of the data stream; and control the transmitter to send, to the receive end device, the L-layer data stream on which the precoding processing has been performed and information used to indicate the signature matrix S.

12. The device according to claim 11, wherein the channel matrix H comprises R second element sequences arranged in the second dimensional direction, each second element sequence of the R second element sequences comprises T second elements arranged in the first dimensional direction, the R second element sequences are in one-to-one correspondence with the R receive antennas used by the receive end device, and the T second element sequences are in one-to-one correspondence with T transmit antennas used by the device; and the processor is configured to: generate a first intermediate matrix according to a quantity K of non-zero elements and locations of the non-zero elements in an $i^{th}$ first element sequence comprised in the signature matrix S, wherein the first intermediate matrix comprises K second element sequences of the R second element sequences;

generate a second intermediate matrix according to a quantity M of zero elements and locations of the zero elements in the $i^{th}$ first element sequence comprised in the signature matrix S, wherein the second intermediate matrix comprises M second element sequences of the R second element sequences, the K second element sequences are different from the M second element sequences, M=R−K, and i belongs to [1, L];

perform singular value decomposition processing on the second intermediate matrix, to determine a null subspace of the second intermediate matrix;

determine a third intermediate matrix according to the null subspace of the second intermediate matrix and the first intermediate matrix;

perform singular value decomposition processing on the third intermediate matrix, to determine an orthogonal subspace of the third intermediate matrix; and determine an $i^{th}$ second element sequence of the precoding matrix P according to the orthogonal subspace of the third intermediate matrix and the null subspace of the second intermediate matrix.

13. The device according to claim 12, wherein the processor is configured to: determine a target sequence from the orthogonal subspace of the third intermediate matrix according to a maximum value of multiple singular values that are obtained by performing the singular value decomposition processing on the third intermediate matrix; and determine the $i^{th}$ second element sequence of the precoding matrix P according to the target sequence and the null subspace of the second intermediate matrix.

14. The device according to claim 11, wherein the processor is configured to determine the precoding matrix P according to the channel matrix H, the signature matrix S, and a power allocation matrix D, wherein the power allocation matrix D is used for power allocation among the L layers of the data stream.

15. The device according to claim 11, wherein the processor is configured to: generate the first intermediate matrix according to the quantity K of the non-zero elements and the locations of the non-zero elements in the $i^{th}$ first element sequence comprised in the signature matrix S, wherein the K second element sequences are in one-to-one correspondence with the K non-zero elements in the $i^{th}$ first element sequence, a location of a $k^{th}$ second element sequence of the K second element sequences in the channel matrix H is the same as a location of a $k^{th}$ non-zero element of the K non-zero elements in the $i^{th}$ first element sequence, and k∈[1, K]; and generate the second intermediate matrix according to the quantity M of the zero elements and the locations of the zero elements in the $i^{th}$ first element sequence comprised in the signature matrix S, wherein the M second element sequences are in one-to-one correspondence with the M zero elements in the $i^{th}$ first element sequence, a location of an $m^{th}$ second element sequence of the M second element sequences in the channel matrix H is the same as a location of an $m^{th}$ non-zero element of the M non-zero elements in the $i^{th}$ first element sequence, m belongs to [1, M], and M=R−K.

16. The device according to claim 11, wherein the processor is configured to determine, based on a mapping relationship between multiple parameter sets and multiple pre-stored signature matrices, the signature matrix S corresponding to the quantity L of layers and the quantity R from the multiple signature matrices, wherein each parameter set of the multiple parameter sets comprises a value of a quantity of layers of a data stream and a value of a quantity of spatial domain resources.

17. The device according to claim 11, wherein the quantity L of layers of the data stream is greater than the quantity R of the receive antennas.

18. A data transmission device, wherein the device comprises:

a bus;

a processor connected to the bus;

a memory connected to the bus; and a receiver connected to the bus, wherein the processor calls, by using the bus, a program stored in the memory, so as to: control the receiver to receive data and information used to indicate a signature matrix S that are sent by a transmit end device, wherein the data comprises an L-layer data stream on which precoding processing has been performed, the L-layer data stream is generated by performing bit mapping processing on L-layer bit information by the transmit end device according to a preset constellation point set, L layers of the data stream correspond to a same time-frequency resource, the signature matrix S comprises L first element sequences arranged in a first dimensional direction, the L first element sequences are in one-to-one correspondence with the L layers of the data stream, each first element sequence of the L first element sequences comprises R first elements arranged in a second dimensional direction, the R first elements are in one-to-one correspondence with R receive antennas, the R first elements comprise at least one zero element and at least one non-zero element, the precoding processing is performed by the transmit end device according to a channel matrix H and the signature matrix S, the channel matrix H corresponds to channels between the transmit end device and the device, and the precoding matrix P comprises L second element sequences arranged in the first dimensional direction; and perform, according to the signature matrix S and the constellation point set, demodulation processing on the L-layer data stream on which the precoding processing has been performed, to obtain the L-layer bit information.

19. The device according to claim 18, wherein the processor is configured to: perform channel estimation to determine data to be demodulated that is based on the L-layer data stream on which the precoding processing has been performed;

determine a codebook according to the signature matrix S and the constellation point set; and perform, according to the codebook, message passing algorithm MPA iterative processing on the data to be demodulated.

20. The device according to claim 19, wherein the codebook comprises two or more codewords, the codewords include a multi-dimensional complex field vector, and are used to indicate a mapping relationship between data and two or more modulation symbols, and the modulation symbols comprise at least one zero modulation symbol and at least one non-zero modulation symbol.

* * * * *